(12) United States Patent
Ekstrand et al.

(10) Patent No.: US 11,663,754 B2
(45) Date of Patent: May 30, 2023

(54) INTERFACE ELEMENT COLOR DISPLAY METHOD AND APPARATUS

(71) Applicant: Huawei Technologies Co., Ltd., Shenzhen (CN)

(72) Inventors: Simon Ekstrand, Lund (SE); Fredrik Andreasson, Lund (SE); Johan Larsby, Lund (SE); Jiangzhen Zheng, Nanjing (CN); Hongyu Qiu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/879,550

(22) Filed: Aug. 2, 2022

(65) Prior Publication Data
US 2022/0375139 A1 Nov. 24, 2022

Related U.S. Application Data

(63) Continuation of application No. 17/187,257, filed on Feb. 26, 2021, now Pat. No. 11,423,590, which is a (Continued)

(30) Foreign Application Priority Data

Aug. 27, 2018 (CN) .......................... 201810982547.4

(51) Int. Cl.
*G06T 11/00* (2006.01)
*G06T 7/90* (2017.01)
(Continued)

(52) U.S. Cl.
CPC .......... *G06T 11/001* (2013.01); *G06F 3/0482* (2013.01); *G06F 3/04845* (2013.01); *G06T 7/90* (2017.01); *G06T 11/60* (2013.01)

(58) Field of Classification Search
CPC ....................................................... G06T 11/001
(Continued)

(56) References Cited

U.S. PATENT DOCUMENTS 6,285,413 B1 * 9/2001 Akbayir .................. H04N 5/20
348/E5.073
7,130,461 B2 * 10/2006 Rosenholtz ...... G06V 30/18105
358/518
(Continued)

FOREIGN PATENT DOCUMENTS

CN 106095447 A 11/2016
CN 106775747 A 5/2017
(Continued)

OTHER PUBLICATIONS

U.S. Appl. No. 17/187,257, filed Feb. 26, 2021.

*Primary Examiner* — Reza Nabi
(74) *Attorney, Agent, or Firm* — Leydig, Voit & Mayer, Ltd.

(57) ABSTRACT

An interface element color display method and apparatus are provided. The method includes: obtaining a target image included in a to-be-displayed interface; performing color updating processing on the to-be-displayed interface, including: determining a first dominant color of the target image, determining a color type of the target image based on an area-based ratio of the first dominant color in the target image, determining a first auxiliary color based on the color type, and setting the first auxiliary color as a color of a foreground element; and outputting the to-be-displayed interface that has undergone the color updating processing to a display device for displaying.

20 Claims, 11 Drawing Sheets

Related U.S. Application Data continuation of application No. PCT/CN2019/101937, filed on Aug. 22, 2019.

(51) Int. Cl.
  *G06F 3/0482* (2013.01)
  *G06F 3/04845* (2022.01)
  *G06T 11/60* (2006.01)

(58) Field of Classification Search
  USPC ........................................... 382/100
  See application file for complete search history.

(56) References Cited

U.S. PATENT DOCUMENTS

| | | | | |
|---|---|---|---|---|
| 7,613,363 | B2* | 11/2009 | Platt | G06T 5/002 |
| | | | | 382/199 |
| 8,264,499 | B1* | 9/2012 | Landry | H04N 9/76 |
| | | | | 715/275 |
| 8,605,940 | B1* | 12/2013 | Wilensky | G06T 7/12 |
| | | | | 382/100 |
| 8,897,552 | B2* | 11/2014 | Phillips | G06T 7/90 |
| | | | | 345/593 |
| 9,542,907 | B2* | 1/2017 | Kocienda | G09G 5/02 |
| 10,319,338 | B2* | 6/2019 | Lee | G09G 3/2003 |
| 10,380,723 | B2* | 8/2019 | Leong | G06T 7/13 |
| 10,497,101 | B2* | 12/2019 | Washio | H04N 1/41 |
| 10,964,023 | B1* | 3/2021 | Vij | G06T 7/174 |
| 2001/0055414 | A1* | 12/2001 | Thieme | G06T 11/60 |
| | | | | 382/162 |
| 2007/0067269 | A1* | 3/2007 | Rudge | G06F 9/451 |
| 2008/0080738 | A1* | 4/2008 | Takahashi | H04N 1/32208 |
| | | | | 382/100 |
| 2009/0119678 | A1* | 5/2009 | Shih | H04L 51/00 |
| | | | | 719/313 |
| 2011/0091092 | A1* | 4/2011 | Nepomniachtchi | G06T 5/006 |
| | | | | 382/137 |
| 2011/0194129 | A1* | 8/2011 | Fujiwara | H04N 1/56 |
| | | | | 358/1.9 |
| 2011/0242122 | A1* | 10/2011 | Bose | G09G 5/08 |
| | | | | 345/545 |
| 2013/0222329 | A1* | 8/2013 | Larsby | G06F 3/04886 |
| | | | | 345/173 |
| 2014/0173713 | A1* | 6/2014 | Zheng | G06F 3/0488 |
| | | | | 726/16 |
| 2015/0154763 | A1* | 6/2015 | Xian | G06T 11/001 |
| | | | | 345/589 |
| 2015/0339828 | A1* | 11/2015 | Djelouah | G06T 7/194 |
| | | | | 382/173 |
| 2016/0133027 | A1* | 5/2016 | Zhao | G06V 10/25 |
| | | | | 382/173 |
| 2016/0163059 | A1* | 6/2016 | Xie | G06V 10/507 |
| | | | | 382/173 |
| 2016/0196665 | A1* | 7/2016 | Abreu | G06T 7/75 |
| | | | | 345/427 |
| 2016/0247305 | A1* | 8/2016 | Borg | G06F 3/04845 |
| 2017/0084047 | A1* | 3/2017 | Yin | G06V 10/56 |
| 2019/0355127 | A1* | 11/2019 | Qiu | H04N 5/23229 |
| 2020/0027249 | A1* | 1/2020 | Loughry | G09G 5/02 |
| 2021/0004996 | A1* | 1/2021 | Murillo | G06T 19/006 |
| 2021/0020139 | A1* | 1/2021 | Ekstrand | G06T 11/60 |
| 2021/0082158 | A1* | 3/2021 | Norris | G06T 11/001 |
| 2021/0209815 | A1* | 7/2021 | Ekstrand | G06T 11/001 |
| 2021/0312679 | A1* | 10/2021 | Ekstrand | G06F 9/454 |

FOREIGN PATENT DOCUMENTS

| | | |
|---|---|---|
| CN | 107479781 A | 12/2017 |
| CN | 107527374 A | 12/2017 |
| CN | 108170431 A | 6/2018 |
| CN | 108446705 A | 8/2018 |
| WO | 2017166752 A1 | 10/2017 |

* cited by examiner

INTERFACE ELEMENT COLOR DISPLAY METHOD AND APPARATUS

CROSS-REFERENCE TO RELATED APPLICATIONS

This application is a continuation of U.S. patent application Ser. No. 17/187,257, filed on Feb. 26, 2021, which is a continuation of International Application No. PCT/CN2019/101937, filed on Aug. 22, 2019. The International Application claims priority to Chinese Patent Application No. 201810982547.4, filed on Aug. 27, 2018. All of the aforementioned patent applications are hereby incorporated by reference in their entireties.

TECHNICAL FIELD

Embodiments of this application relate to the image processing field, and more specifically, to an interface element color display method and an apparatus.

BACKGROUND

Currently, interaction interfaces of a plurality of applications may display images and foreground elements. In a plurality of scenarios, a foreground element is used as a foreground of an image, and the foreground element may be an element such as an icon or a text.

To form a visual association between a foreground element and an image, a color picker in the industry first selects a target color from a plurality of colors in the image according to some user-defined rules, and then automatically uses the target color as a color of the foreground element, to ensure a similarity between a color of the image and the color of the foreground element, so that a user has more immersive experience when the user browses the image and the foreground element on an interaction interface.

In the foregoing image color picking method, a great difference may exist between a hue of the selected target color and a hue of each of the plurality of colors in the image. For example, assuming that the selected target color is red, but the plurality of colors in the image are mainly green and blue, great differences exist between the hue of the target color and hues of the plurality of colors in the image. If great differences exist between the hue of the selected target color and the hues of the plurality of colors in the image, and the target color is used as the color of the foreground element, the colors in the image and the color of the foreground element may conflict greatly, subject to poor color fusion. Consequently, the user cannot have immersive experience when browsing the image and the foreground element on the interaction interface.

SUMMARY

Embodiments of this application provide an interface element color display method and an apparatus, so that good contrast and color fusion exist between a color of a foreground element and a color of a target image on an interface.

The embodiments of this application are implemented as follows:

According to a first aspect, an embodiment of this application provides an interface element color display method. The method includes: obtaining a target image included in a to-be-displayed interface, where the to-be-displayed interface includes a foreground element and a background element, the background element is used as a background of the foreground element, and the background element includes the target image; performing color updating processing on the to-be-displayed interface, including: determining a first dominant color of the target image, determining a color type of the target image based on an area-based ratio of the first dominant color in the target image, determining a first auxiliary color based on the color type, and setting the first auxiliary color as a color of the foreground element, where the first dominant color is a main color in the target image, and the first auxiliary color is a color with a hue close to that of the first dominant color but with a difference in saturation or brightness; and outputting the to-be-displayed interface that has undergone the color updating processing to a display device for displaying.

In the first aspect, the hue of the first dominant color of the target image is close to the hue of the first auxiliary color, and after the first auxiliary color is set as the color of the foreground element, there is good color fusion between the first dominant color of the target image and the color of the foreground element. In addition, because there is a difference between the first dominant color and the first auxiliary color in saturation or brightness, there is also good contrast between the first dominant color and the first auxiliary color, and there is good contrast between the first dominant color of the target image and the color of the foreground element. Therefore, when a user browses the to-be-displayed interface, the user has strong immersive experience.

In a possible implementation of the first aspect, the determining a first auxiliary color based on the color type includes: obtaining a dominant color adjustment parameter corresponding to the color type of the target image, where the dominant color adjustment parameter includes at least one of brightness and saturation; adjusting the first dominant color based on the dominant color adjustment parameter to generate a first bright auxiliary color and a first dark auxiliary color; and determining the first bright auxiliary color or the first dark auxiliary color as the first auxiliary color.

In a possible implementation of the first aspect, the obtaining a dominant color adjustment parameter corresponding to the color type of the target image includes: when the color type of the target image is a polychromatic general type or a monochromatic colorful type, obtaining a first brightness adjustment value, a second brightness adjustment value, a first saturation adjustment value, and a second saturation adjustment value corresponding to the polychromatic general type or the monochromatic colorful type, where the first brightness adjustment value and the second brightness adjustment value are separately used to adjust brightness of the first dominant color, the first saturation adjustment value and the second saturation adjustment value are separately used to adjust saturation of the first dominant color, and the dominant color adjustment parameter includes the first brightness adjustment value, the second brightness adjustment value, the first saturation adjustment value, and the second saturation adjustment value; the polychromatic general type is used to indicate that a ratio of a quantity of pixels corresponding to the first dominant color in the target image to a quantity of pixels corresponding to the target image is less than a first threshold, a ratio of a quantity of pixels corresponding to colors having a same three-channel red-green-blue value in the target image to the quantity of pixels corresponding to the target image is less than a second threshold, and the saturation of the first dominant color is greater than a third threshold; and the monochromatic colorful type is used to indicate that the ratio of the quantity of pixels corresponding to the first dominant color in the target image to the quantity of pixels corresponding to the target image is greater than the first threshold, and the saturation of the first dominant color is greater than 0; or when the color type of the target image is a polychromatic low saturation type, a polychromatic grayscale type, or a monochromatic achromatic type, obtaining a first brightness adjustment value and a second brightness adjustment value corresponding to the polychromatic low saturation type, the polychromatic grayscale type, or the monochromatic achromatic type, where the first brightness adjustment value and the second brightness adjustment value are separately used to adjust brightness of the first dominant color, and the dominant color adjustment parameter includes the first brightness adjustment value and the second brightness adjustment value; the polychromatic low saturation type is used to indicate that a ratio of a quantity of pixels corresponding to the first dominant color in the target image to a quantity of pixels corresponding to the target image is less than a first threshold, a ratio of a quantity of pixels corresponding to colors having a same three-channel red-green-blue value in the target image to the quantity of pixels corresponding to the target image is less than a second threshold, and saturation of the first dominant color is less than a third threshold; the polychromatic grayscale type is used to indicate that the ratio of the quantity of pixels corresponding to the first dominant color in the target image to the quantity of pixels corresponding to the target image is less than the first threshold, and the ratio of the quantity of pixels corresponding to the colors having the same three-channel red-green-blue value in the target image to the quantity of pixels corresponding to the target image is greater than the second threshold; and the monochromatic achromatic type is used to indicate that the ratio of the quantity of pixels corresponding to the first dominant color in the target image to the quantity of pixels corresponding to the target image is greater than the first threshold, and the saturation of the first dominant color is equal to 0.

In a possible implementation of the first aspect, the adjusting the first dominant color based on the dominant color adjustment parameter to generate a first bright auxiliary color and a first dark auxiliary color includes: adjusting the brightness and saturation of the first dominant color based on the first brightness adjustment value and the first saturation adjustment value to generate the first bright auxiliary color, and adjusting the brightness and saturation of the first dominant color based on the second brightness adjustment value and the second saturation adjustment value to generate the first dark auxiliary color; or adjusting the brightness of the first dominant color based on the first brightness adjustment value to generate the first bright auxiliary color, and adjusting the brightness of the first dominant color based on the second brightness adjustment value to generate the first dark auxiliary color.

In a possible implementation of the first aspect, the determining the first bright auxiliary color or the first dark auxiliary color as the first auxiliary color includes: determining whether a ratio of a brightness differentiation parameter of the first dominant color to a brightness differentiation parameter of the first bright auxiliary color is greater than a fourth threshold or less than a reciprocal of the fourth threshold; and when the ratio of the brightness differentiation parameter of the first dominant color to the brightness differentiation parameter of the first bright auxiliary color is greater than the fourth threshold or less than the reciprocal of the fourth threshold, determining the first bright auxiliary color as the first auxiliary color; or when the ratio of the brightness differentiation parameter of the first dominant color to the brightness differentiation parameter of the first bright auxiliary color is less than the fourth threshold or greater than the reciprocal of the fourth threshold, determining the first dark auxiliary color as the first auxiliary color.

In a possible implementation of the first aspect, the determining a first dominant color of the target image includes: obtaining each color in the target image; sorting each color in the target image in a preset arrangement order to obtain a color queue, where the preset arrangement order is a pre-generated arrangement order of colors; dividing the color queue into a plurality of color groups based on a preset grouping method and a quantity of pixels of each color in the target image, where each of the plurality of color groups includes at least one color; determining, in the plurality of color groups, a target color group having a largest quantity of pixels; and generating the first dominant color based on all colors in the target color group.

In a possible implementation of the first aspect, the generating the first dominant color based on all colors in the target color group includes: obtaining a three-channel red-green-blue value of each color in the target color group, where the three-channel red-green-blue value includes a red channel value, a green channel value, and a blue channel value; calculating a target red channel value based on the red channel value of each color in the target color group and a ratio of a quantity of pixels of each color in the target color group to a quantity of pixels in the target color group; calculating a target green channel value based on the green channel value of each color in the target color group and the ratio of the quantity of pixels of each color in the target color group to the quantity of pixels in the target color group; calculating a target blue channel value based on the blue channel value of each color in the target color group and the ratio of the quantity of pixels of each color in the target color group to the quantity of pixels in the target color group; and combining the target red channel value, the target green channel value, and the target blue channel value into a target three-channel red-green-blue value to obtain the first dominant color.

In a possible implementation of the first aspect, after the determining a color type of the target image based on an area-based ratio of the first dominant color in the target image, the method further includes: when the color type of the target image is a polychromatic type, determining, in the plurality of color groups, a specified color group having a second largest quantity of pixels, and generating a second dominant color based on all colors in the specified color group, where the polychromatic type is used to indicate that a ratio of a quantity of pixels corresponding to the first dominant color in the target image to a quantity of pixels corresponding to the target image is less than a first threshold; or when the color type of the target image is a monochromatic colorful type, obtaining a second dominant color adjustment value corresponding to the monochromatic colorful type, and configuring the hue of the first dominant color based on the second dominant color adjustment value to generate a second dominant color, where the monochromatic colorful type is used to indicate that a ratio of a quantity of pixels corresponding to the first dominant color in the target image to a quantity of pixels corresponding to the target image is greater than a first threshold, and saturation of the first dominant color is greater than 0; or when the color type of the target image is a monochromatic achromatic type, obtaining a second dominant color adjustment value corresponding to the monochromatic achromatic type, and configuring brightness of the first dominant color based on the second dominant color adjustment value to generate a second dominant color, where the monochromatic achromatic type is used to indicate that a ratio of a quantity of pixels corresponding to the first dominant color in the target image to a quantity of pixels corresponding to the target image is greater than a first threshold, and saturation of the first dominant color is equal to 0.

In a possible implementation of the first aspect, after the second dominant color is generated, the method further includes: obtaining a dominant color adjustment parameter corresponding to the color type of the target image, where the dominant color adjustment parameter includes at least one of brightness and saturation; adjusting the second dominant color based on the dominant color adjustment parameter to generate a second bright auxiliary color and a second dark auxiliary color; determining the second bright auxiliary color or the second dark auxiliary color as a second auxiliary color, where the second auxiliary color is a color with a hue close to that of the second dominant color but with a difference in saturation or brightness; when an instruction for setting the second auxiliary color as the color of the foreground element is received, setting the second auxiliary color as the color of the foreground element; and setting the second dominant color as a color of a background layer, where the background layer is a layer with unchanged transparency or a layer with gradient transparency, the background element further includes the background layer, and the background layer is located between the target image and the foreground element.

In a possible implementation of the first aspect, the background element further includes a background layer, the background layer is located between the target image and the foreground element, and the performing color updating processing on the target image further includes: setting the first dominant color as a color of the background layer, where the background layer is a layer with unchanged transparency or a layer with gradient transparency.

In a possible implementation of the first aspect, after the determining a first dominant color of the target image, and before the outputting the to-be-displayed interface that has undergone the color updating processing to a display device for displaying, the method further includes: obtaining an image region by extending one side or a plurality of sides of the target image, where the image region includes the first dominant color; and using the image region and the target image as an updated target image.

According to a second aspect, an embodiment of this application provides a terminal. The terminal includes: an obtaining module, configured to obtain a target image included in a to-be-displayed interface, where the to-be-displayed interface includes a foreground element and a background element, the background element is used as a background of the foreground element, and the background element includes the target image; an updating module, configured to perform color updating processing on the to-be-displayed interface, including: determining a first dominant color of the target image, determining a color type of the target image based on an area-based ratio of the first dominant color in the target image, determining a first auxiliary color based on the color type, and setting the first auxiliary color as a color of the foreground element, where the first dominant color is a main color in the target image, and the first auxiliary color is a color with a hue close to that of the first dominant color but with a difference in saturation or brightness; and a display output module, configured to output the to-be-displayed interface that has undergone the color updating processing to a display device for displaying.

In a possible implementation of the second aspect, the updating module is configured to: obtain a dominant color adjustment parameter corresponding to the color type of the target image, where the dominant color adjustment parameter includes at least one of brightness and saturation; adjust the first dominant color based on the dominant color adjustment parameter to generate a first bright auxiliary color and a first dark auxiliary color; and determine the first bright auxiliary color or the first dark auxiliary color as the first auxiliary color.

In a possible implementation of the second aspect, the updating module is configured to: when the color type of the target image is a polychromatic general type or a monochromatic colorful type, obtain a first brightness adjustment value, a second brightness adjustment value, a first saturation adjustment value, and a second saturation adjustment value corresponding to the polychromatic general type or the monochromatic colorful type, where the first brightness adjustment value and the second brightness adjustment value are separately used to adjust brightness of the first dominant color, the first saturation adjustment value and the second saturation adjustment value are separately used to adjust saturation of the first dominant color, and the dominant color adjustment parameter includes the first brightness adjustment value, the second brightness adjustment value, the first saturation adjustment value, and the second saturation adjustment value; the polychromatic general type is used to indicate that a ratio of a quantity of pixels corresponding to the first dominant color in the target image to a quantity of pixels corresponding to the target image is less than a first threshold, a ratio of a quantity of pixels corresponding to colors having a same three-channel red-green-blue value in the target image to the quantity of pixels corresponding to the target image is less than a second threshold, and the saturation of the first dominant color is greater than a third threshold; and the monochromatic colorful type is used to indicate that the ratio of the quantity of pixels corresponding to the first dominant color in the target image to the quantity of pixels corresponding to the target image is greater than the first threshold, and the saturation of the first dominant color is greater than 0; or the updating module is configured to: when the color type of the target image is a polychromatic low saturation type, a polychromatic grayscale type, or a monochromatic achromatic type, obtain a first brightness adjustment value and a second brightness adjustment value corresponding to the polychromatic low saturation type, the polychromatic grayscale type, or the monochromatic achromatic type, where the first brightness adjustment value and the second brightness adjustment value are separately used to adjust brightness of the first dominant color, and the dominant color adjustment parameter includes the first brightness adjustment value and the second brightness adjustment value; the polychromatic low saturation type is used to indicate that a ratio of a quantity of pixels corresponding to the first dominant color in the target image to a quantity of pixels corresponding to the target image is less than a first threshold, a ratio of a quantity of pixels corresponding to colors having a same three-channel red-green-blue value in the target image to the quantity of pixels corresponding to the target image is less than a second threshold, and saturation of the first dominant color is less than a third threshold; the polychromatic grayscale type is used to indicate that the ratio of the quantity of pixels corresponding to the first dominant color in the target image to the quantity of pixels corresponding to the target image is less than the first threshold, and the ratio of the quantity of pixels corresponding to the colors having the same three-channel red-green-blue value in the target image to the quantity of pixels corresponding to the target image is greater than the second threshold; and the monochromatic achromatic type is used to indicate that the ratio of the quantity of pixels corresponding to the first dominant color in the target image to the quantity of pixels corresponding to the target image is greater than the first threshold, and the saturation of the first dominant color is equal to 0.

In a possible implementation of the second aspect, the updating module is configured to adjust the brightness and saturation of the first dominant color based on the first brightness adjustment value and the first saturation adjustment value to generate the first bright auxiliary color, and adjust the brightness and saturation of the first dominant color based on the second brightness adjustment value and the second saturation adjustment value to generate the first dark auxiliary color; or the updating module is configured to adjust the brightness of the first dominant color based on the first brightness adjustment value to generate the first bright auxiliary color, and adjust the brightness of the first dominant color based on the second brightness adjustment value to generate the first dark auxiliary color.

In a possible implementation of the second aspect, the updating module is configured to: determine whether a ratio of a brightness differentiation parameter of the first dominant color to a brightness differentiation parameter of the first bright auxiliary color is greater than a fourth threshold or less than a reciprocal of the fourth threshold; and when the ratio of the brightness differentiation parameter of the first dominant color to the brightness differentiation parameter of the first bright auxiliary color is greater than the fourth threshold or less than the reciprocal of the fourth threshold, determine the first bright auxiliary color as the first auxiliary color; or when the ratio of the brightness differentiation parameter of the first dominant color to the brightness differentiation parameter of the first bright auxiliary color is less than the fourth threshold or greater than the reciprocal of the fourth threshold, determine the first dark auxiliary color as the first auxiliary color, where the brightness differentiation parameter of the first bright auxiliary color is greater than a brightness differentiation parameter of the first dark auxiliary color, the brightness differentiation parameter of the first dominant color is obtained through calculation based on a three-channel red-green-blue value of the first dominant color, the brightness differentiation parameter of the first bright auxiliary color is obtained through calculation based on a three-channel red-green-blue value of the first bright auxiliary color, and the brightness differentiation parameter of the first dark auxiliary color is obtained through calculation based on a three-channel red-green-blue value of the first dark auxiliary color.

In a possible implementation of the second aspect, the updating module is configured to: obtain each color in the target image; sort each color in the target image in a preset arrangement order to obtain a color queue, where the preset arrangement order is a pre-generated arrangement order of colors; divide the color queue into a plurality of color groups based on a preset grouping method and a quantity of pixels of each color in the target image, where each of the plurality of color groups includes at least one color; determine, in the plurality of color groups, a target color group having a largest quantity of pixels; and generate the first dominant color based on all colors in the target color group.

In a possible implementation of the second aspect, the updating module is configured to: obtain a three-channel red-green-blue value of each color in the target color group, where the three-channel red-green-blue value includes a red channel value, a green channel value, and a blue channel value; calculate a target red channel value based on the red channel value of each color in the target color group and a ratio of a quantity of pixels of each color in the target color group to a quantity of pixels in the target color group; calculate a target green channel value based on the green channel value of each color in the target color group and the ratio of the quantity of pixels of each color in the target color group to the quantity of pixels in the target color group; calculate a target blue channel value based on the blue channel value of each color in the target color group and the ratio of the quantity of pixels of each color in the target color group to the quantity of pixels in the target color group; and combine the target red channel value, the target green channel value, and the target blue channel value into a target three-channel red-green-blue value to obtain the first dominant color.

In a possible implementation of the second aspect, the updating module is further configured to: when the color type of the target image is a polychromatic type, determine, in the plurality of color groups, a specified color group having a second largest quantity of pixels, and generate a second dominant color based on all colors in the specified color group, where the polychromatic type is used to indicate that a ratio of a quantity of pixels corresponding to the first dominant color in the target image to a quantity of pixels corresponding to the target image is less than a first threshold; or the updating module is further configured to: when the color type of the target image is a monochromatic colorful type, obtain a second dominant color adjustment value corresponding to the monochromatic colorful type, and configure the hue of the first dominant color based on the second dominant color adjustment value to generate a second dominant color, where the monochromatic colorful type is used to indicate that a ratio of a quantity of pixels corresponding to the first dominant color in the target image to a quantity of pixels corresponding to the target image is greater than a first threshold, and saturation of the first dominant color is greater than 0; or the updating module is further configured to: when the color type of the target image is a monochromatic achromatic type, obtain a second dominant color adjustment value corresponding to the monochromatic achromatic type, and configure brightness of the first dominant color based on the second dominant color adjustment value to generate a second dominant color, where the monochromatic achromatic type is used to indicate that a ratio of a quantity of pixels corresponding to the first dominant color in the target image to a quantity of pixels corresponding to the target image is greater than a first threshold, and saturation of the first dominant color is equal to 0.

In a possible implementation of the second aspect, the updating module is further configured to: obtain a dominant color adjustment parameter corresponding to the color type of the target image, where the dominant color adjustment parameter includes at least one of brightness and saturation; adjust the second dominant color based on the dominant color adjustment parameter to generate a second bright auxiliary color and a second dark auxiliary color; determine the second bright auxiliary color or the second dark auxiliary color as a second auxiliary color, where the second auxiliary color is a color with a hue close to that of the second dominant color but with a difference in saturation or brightness; when an instruction for setting the second auxiliary color as the color of the foreground element is received, set the second auxiliary color as the color of the foreground element; and set the second dominant color as a color of a background layer, where the background layer is a layer with unchanged transparency or a layer with gradient transparency, the background element further includes the background layer, and the background layer is located between the target image and the foreground element.

In a possible implementation of the second aspect, the updating module is further configured to set the first dominant color as a color of a background layer, where the background layer is a layer with unchanged transparency or a layer with gradient transparency.

In a possible implementation of the second aspect, the updating module is further configured to: obtain an image region by extending one side or a plurality of sides of the target image, where the image region includes the first dominant color; and use the image region and the target image as an updated target image.

According to a third aspect, this application discloses a terminal, including one or more processors and a memory, where the one or more processors are configured to read software code stored in the memory and perform the method according to any one of the first aspect and the implementations of the first aspect.

According to a fourth aspect, this application discloses a computer-readable storage medium, where the computer-readable storage medium stores software code, and when being read by one or more processors, the software code is code capable of performing the method according to the first aspect and the implementations of the first aspect.

DETAILED DESCRIPTION

Figure 1:
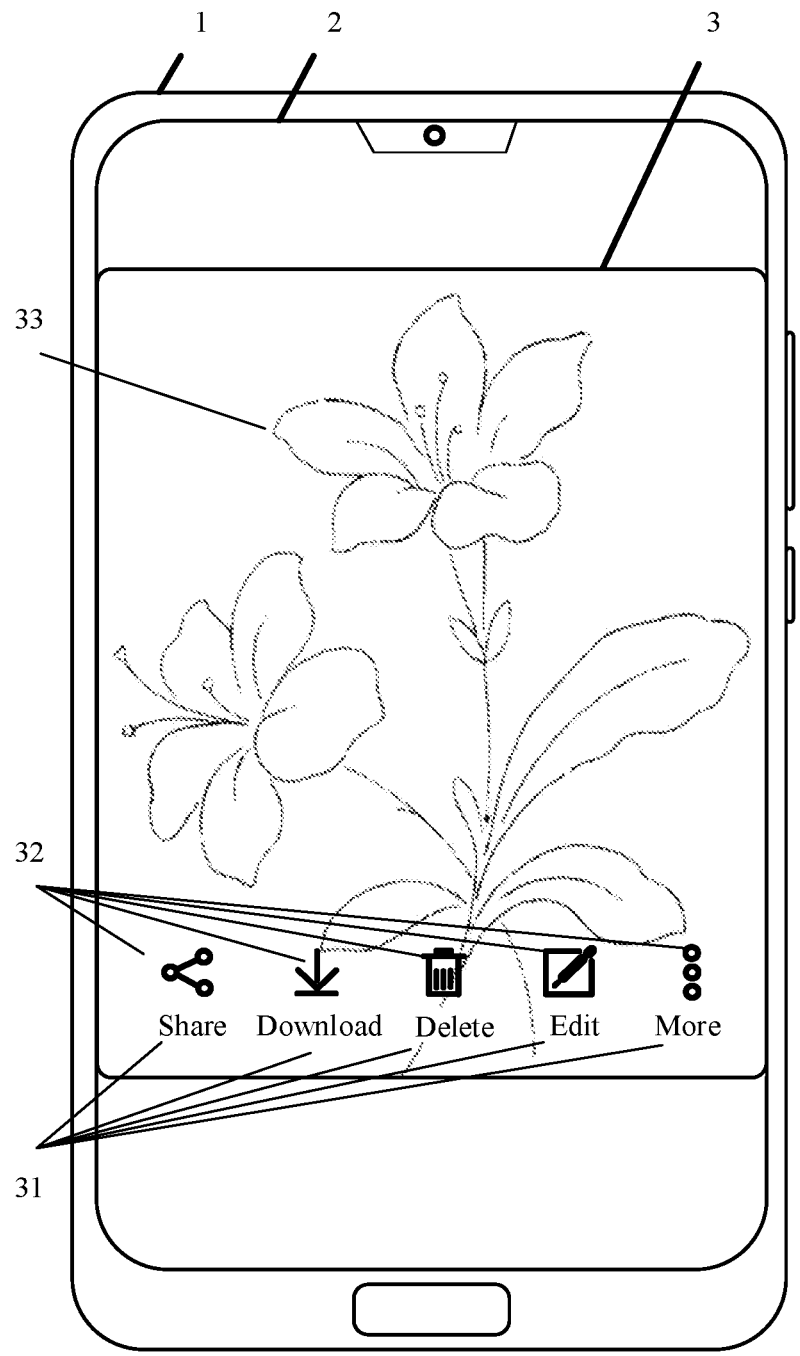
FIG. 1 is a schematic diagram of a terminal interface according to an embodiment of this application.

FIG. 1 is a schematic diagram of a terminal interface according to an embodiment of this application. In FIG. 1, a touchscreen 2 of a terminal 1 is currently displaying a gallery interface 3. The gallery interface 3 includes a text 31, an icon 32, and an image 33. The image 33 is used as a background of the text 31 and the icon 32. The text 31 and the icon 32 are used as a foreground of the image 33. The text 31 and the icon 32 belong to a foreground element. The image 33 belongs to a background element. The background element is used as a background of the foreground element.

In the embodiment shown in FIG. 1, the text 31 on the gallery interface 3 includes "Share", "Download", "Delete", "Edit", and "More". The icon 32 on the gallery interface 3 includes a "Share" function button, a "Download" function button, a "Delete" function button, an "Edit" function button, and a "More" function button. The image 33 on the gallery interface 3 is a plant.

In the embodiment shown in FIG. 1, after the terminal 1 receives an instruction for displaying the image 33, the terminal 1 may first generate a first dominant color based on colors in the image 33, determine a color type of the image 33 based on an area-based ratio of the first dominant color in the image 33, and determine a first auxiliary color based on the color type; then set the first auxiliary color as a color of the text 31 and a color of the icon 32 on the gallery interface 3, that is, set the first auxiliary color as a color of the foreground element of the gallery interface 3; and finally display the gallery interface 3 after the color change. In the process in which the terminal 1 generates the first auxiliary color based on the first dominant color in the image 33, the selected first dominant color may be a main color in the image 33, and the generated first auxiliary color may be a color with a hue close to that of the first dominant color but with a difference in saturation or brightness. Being close in hue means that an absolute value of hue difference between the first dominant color and the first auxiliary color is less than a threshold. For example, the threshold may be 30 degrees.

In the embodiment shown in FIG. 1, because the hue of the first dominant color is close to the hue of the first auxiliary color, there is good color fusion between the color of the text 31 and the color of the icon 32 and the color of the image 33, that is, there is good color fusion between the first dominant color and the first auxiliary color. In addition, because there is a difference between the first dominant color and the first auxiliary color in saturation or brightness, there is good contrast between the color of the text 31 and the color of the icon 32 and the color of the image 33, that is, there is also good contrast between the first dominant color and the first auxiliary color. Therefore, when a user browses the text 31, the icon 32, and the image 33 on the gallery interface 3, the user has strong immersive experience.

Certainly, the interface in this embodiment of this application is not limited to the gallery interface of the terminal shown in FIG. 1, and may also be another type of interface on the terminal. For example, the interface of the terminal may also be a lock screen interface of the terminal or a lock screen interface of an application. For example, alternatively, the interface of the terminal may be an interface of a music player on the terminal. For example, alternatively, the interface of the terminal may be a notification bar interface of the terminal. In summary, a scenario in which an interface element color display method provided in an embodiment of this application is used is not limited to the foregoing interfaces of the terminal. The interface element color display method provided in the embodiment of this application may be used for various interfaces on the terminal as long as the interfaces on the terminal include foreground elements and background elements.

The terminal 1 shown in FIG. 1 may be a device such as a desktop computer, a notebook computer, a palmtop computer, or a smartphone. The device generally includes one or more processors, a memory, and a display device. The one or more processors are configured to read code stored in the memory to execute a corresponding program. When there is one processor, the processor may be a central processing unit (CPU). When there are a plurality of processors, the processors may include one CPU and further include one or more image processors (for example, graphics processing units (GPUs)). One or more of the processors may be packaged on one chip, or the processors may be independently packaged on a plurality of chips. In this application, the display device is a hardware device used for displaying, for example, various devices that may be used for displaying, such as a display screen of the terminal or a display of a personal computer. The device is connected to the processor by using various interfaces. After the processor completes processing of data (for example, a to-be-displayed interface is obtained), the data is sent through an interface to the display device for displaying.

FIG. 1 illustrates how to apply an interface element color display method provided in an embodiment of this application to an exemplary terminal interface. The following describes in detail interface element color display methods provided in embodiments of this application. It may be understood that these methods may be implemented by one or more processors.

Figure 2:
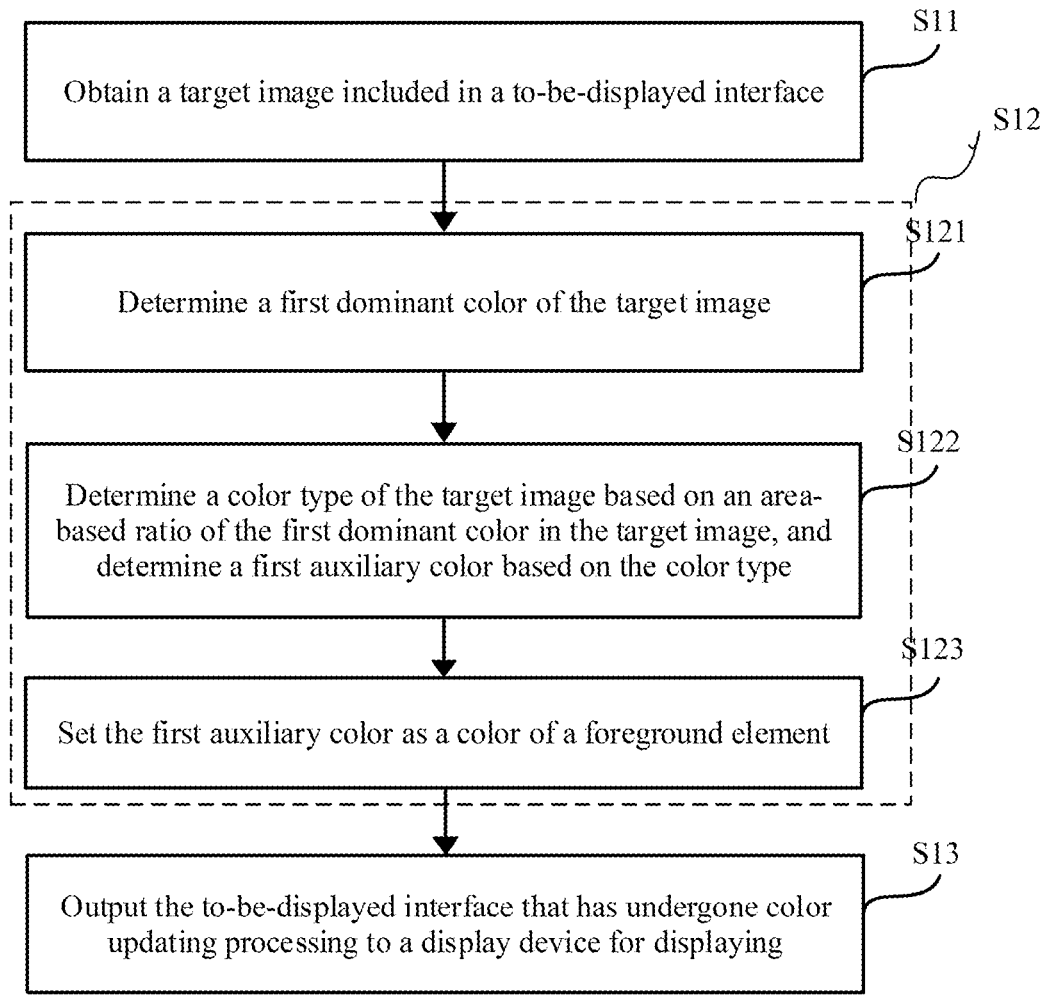
FIG. 2 is a flowchart of an interface element color display method according to an embodiment of this application.

FIG. 2 is a flowchart of an interface element color display method according to an embodiment of this application. The method shown in FIG. 2 may be used to achieve good contrast and color fusion between a color of a foreground element and a color of a target image on a terminal interface. The method shown in FIG. 2 may be applied to a terminal. The method shown in FIG. 2 includes the following steps.

At step S11: obtain a target image included in a to-be-displayed interface.

To-be-displayed interfaces of a terminal may be different interfaces in different technical scenarios.

For example, after the terminal is powered on, and before the terminal enters a lock screen interface, the terminal may first obtain a target image included in the lock screen interface.

For another example, with reference to FIG. 1, assuming that the user enters an instruction for viewing the image 33 to the terminal 1, after the terminal 1 receives the instruction for viewing the image 33, and before the touchscreen 2 displays the image 33 of the gallery interface 3, the terminal 1 may first obtain the image 33 of the gallery interface 3.

In step S11, the to-be-displayed interface includes a foreground element and a background element. The background element is an element used as a background of the foreground element. The background element includes the target image.

For example, with reference to FIG. 1, the to-be-displayed interface may be the gallery interface 3 in FIG. 1, the target image may be the image 33 in FIG. 1, the foreground element may be the text 31 and the icon 32 in FIG. 1, and the background element includes the image 33 in FIG. 1.

In step S11, the target image included in the to-be-displayed interface may be obtained in a plurality of manners. The following describes several exemplary manners.

First manner: obtain an original image included in the to-be-displayed interface, and determine the original image as the target image.

In this first manner, the original image is a complete image on the to-be-displayed interface, and the target image is a complete image on the to-be-displayed interface.

For example, with reference to FIG. 1, the image 33 included in the gallery interface 3 may be understood as the original image included in the to-be-displayed interface, and the target image is the image 33 included in the gallery interface 3.

Second manner: obtain an original image included in the to-be-displayed interface, determine a preset target region on the to-be-displayed interface, and crop the target image in the target region from the original image.

In the second manner, the original image is a complete image on the to-be-displayed interface, the preset target region is a preset region on the to-be-displayed interface, and the target image is an image of the original image that is displayed in the target region.

Figure 3:
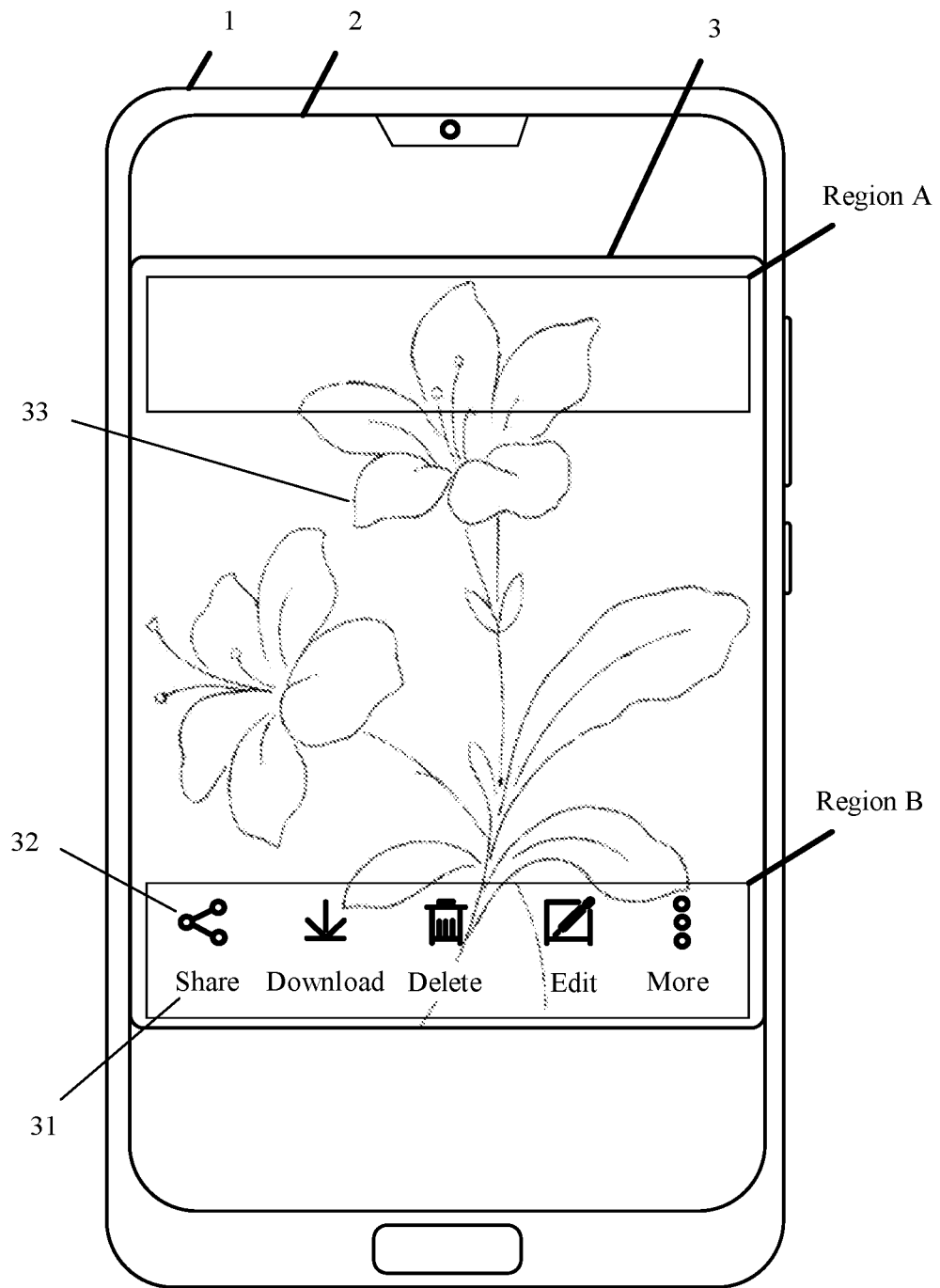
FIG. 3 is a schematic diagram of a terminal interface according to an embodiment of this application.
Figure 4:
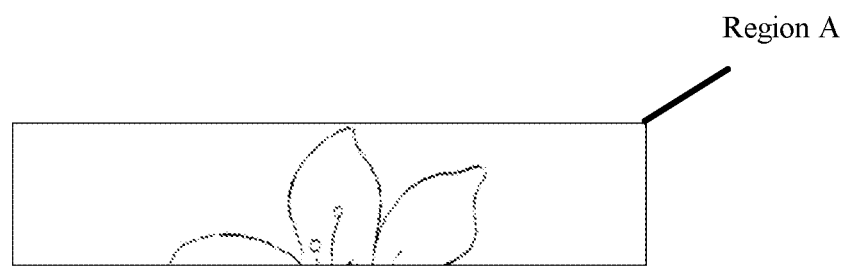
FIG. 4 is a schematic diagram of an image in a region A in FIG. 3.

For example, with reference to FIG. 3 and FIG. 4, FIG. 3 is a schematic diagram of a terminal interface according to an embodiment of this application, and FIG. 4 is a schematic diagram of an image in a region A in FIG. 3. In FIG. 3 and FIG. 4, assuming that the preset target region is the region A, the target image in the region A may be obtained by cropping the image in the region A from the image 33, as shown in FIG. 4.

Third manner: obtain an original image included in the to-be-displayed interface, determine a target region in which the foreground element is located on the to-be-displayed interface, and crop the target image in the target region from the original image.

In the third manner, the original image is a complete image on the to-be-displayed interface, the target region is the region in which the foreground element is located on the to-be-displayed interface, and the target image is an image of the original image that is displayed in the target region.

Figure 5:
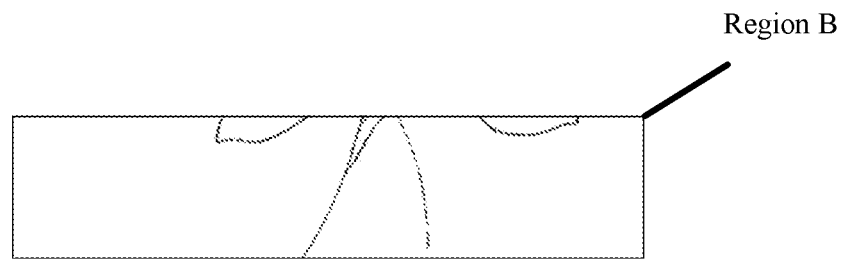
FIG. 5 is a schematic diagram of an image in a region B in FIG. 3.

For example, with reference to FIG. 3 and FIG. 5, FIG. 5 is a schematic diagram of an image in a region B in FIG. 3. In FIG. 3 and FIG. 5, the text 31 and the icon 32 on the gallery interface 3 are both located in the region B, that is, the target region in which the foreground element is located on the to-be-displayed interface is the region B. After the image in the region B is cropped from the image 33, the target image in the region B may be obtained, as shown in FIG. 5.

At step S12: perform color updating processing on the to-be-displayed interface.

After the terminal obtains the target image included in the to-be-displayed interface, the terminal needs to perform color updating processing on the to-be-displayed interface. Performing color updating processing on the to-be-displayed interface by the terminal may include S121, step S122, and step S123.

At step S121: determine a first dominant color of the target image.

The terminal may determine the first dominant color of the target image in a plurality of manners. For example, the terminal may generate a dominant color based on a main color in the target image. For another example, the terminal may select a main color from the target image. Regardless of which manner is used to generate the dominant color of the target image, the dominant color is the main color in the target image.

At step S122: determine a color type of the target image based on an area-based ratio of the first dominant color in the target image, and determine a first auxiliary color based on the color type.

The ratio of the area occupied by the first dominant color in the target image is a ratio of a quantity of pixels of the first dominant color in the target image to a quantity of pixels in the target image. For example, assuming that the quantity of pixels of the first dominant color in the target image is 500 and that the quantity of pixels in the target image 1000, the ratio of the area occupied by the first dominant color in the target image is 500±1000=50%.

There are a plurality of color types. The plurality of color types are described in detail in subsequent embodiments.

The terminal may determine the first auxiliary color based on the color type in a plurality of manners. Regardless of which manner is used, compliance with the following rule is required: A hue of the first auxiliary color is close to a hue of the first dominant color, and there is a difference between the first auxiliary color and the first dominant color in saturation or brightness.

At step S123: set the first auxiliary color as a color of the foreground element.

After the terminal determines the first auxiliary color based on the color type, the terminal needs to set the first auxiliary color as the color of the foreground element.

At step S13: output the to-be-displayed interface that has undergone the color updating processing to a display device for displaying.

For example, a processor includes a CPU, and displaying may be performed by using an interface between the CPU and the display device.

In the embodiment shown in FIG. 2, the hue of the first dominant color of the target image is close to the hue of the first auxiliary color, and after the first auxiliary color is set as the color of the foreground element, there is good color fusion between the first dominant color of the target image and the color of the foreground element. In addition, because there is a difference between the first dominant color and the first auxiliary color in saturation or brightness, there is also good contrast between the first dominant color and the first auxiliary color, and there is good contrast between the first dominant color of the target image and the color of the foreground element. Therefore, when the user browses the to-be-displayed interface, the user has strong immersive experience.

In the embodiment shown in FIG. 2, after step S123, that is, after the first auxiliary color is set as the color of the foreground element, the method may further include the following step: setting the first dominant color as a color of a background layer.

The background element further includes the background layer. The background layer is located between the target image and the foreground element. The background layer is a layer with unchanged transparency or gradient transparency.

To better highlight the foreground element in the target image, the first dominant color may be set as the color of the background layer. Because the background layer is located between the target image and the foreground element, the background layer may be used to set off the foreground element and further highlight the foreground element. Moreover, the hue of the first dominant color is close to the hue of the first auxiliary color, and there is good color fusion between the color of the background layer and the color of the foreground element. In addition, because there is a difference between the first dominant color and the first auxiliary color in saturation or brightness, there is also good contrast between the first dominant color and the first auxiliary color, and there is good contrast between the color of the background layer and the color of the foreground element. Therefore, when the user browses the to-be-displayed interface, the user has strong immersive experience.

In the embodiment shown in FIG. 2, after step S121, that is, after determining the first dominant color of the target image, the method may further include the following step: obtaining an image region by extending one side or a plurality of sides of the target image, where the image region includes the first dominant color; and using the image region and the target image as an updated target image.

After the terminal determines the first dominant color of the target image, the terminal may further obtain an image region by extending one side or a plurality of sides of the target image, and may set the foreground element in this image region. Therefore, the foreground element can be prevented from being located in the target image and blocking the target image, and the user can see the target image not blocked by the foreground element. In addition, because the color of the foreground element is the first auxiliary color, using the first dominant color as a color of the image region can ensure that there is good contrast between the color of the image region and the color of the foreground element. Therefore, when the user browses the to-be-displayed interface, the user has strong immersive experience.

Figure 6:
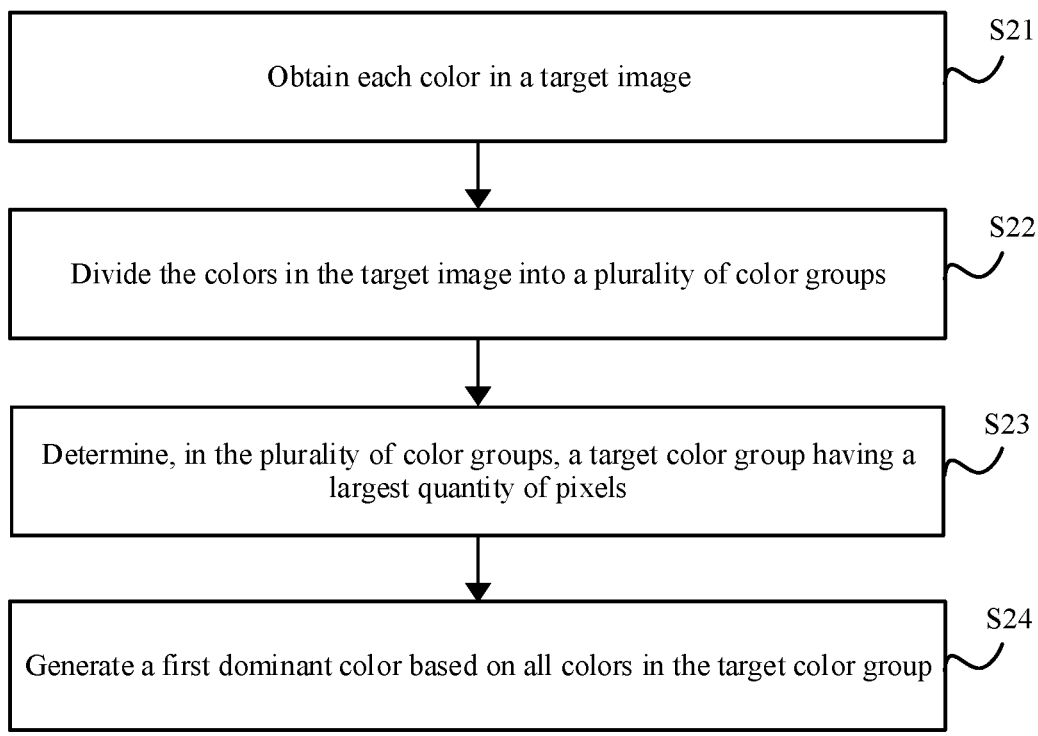
FIG. 6 is a flowchart of another interface element color display method according to an embodiment of this application.

FIG. 6 is a flowchart of another interface element color display method according to an embodiment of this application. The embodiment shown in FIG. 6 is an exemplary implementation of step S121 in FIG. 2, that is, the embodiment shown in FIG. 6 is how to determine a first dominant color of a target image. The method shown in FIG. 6 includes the following steps.

At step S21: obtain each color in a target image.

After a terminal obtains a target image included in a to-be-displayed interface, the terminal needs to first obtain each color in the target image, so that the terminal obtains a main color in the target image by using each color in the target image and generates a first dominant color by using the main color in the target image. The main color in the target image may be one color or may be a plurality of colors.

For example, with reference to FIG. 1, it is assumed that the image 33 included in the gallery interface 3 has 20 colors. After the terminal 1 obtains the image 33 included in the gallery interface 3, the terminal needs to obtain the 20 colors in the image 33.

At step S22: divide the colors in the target image into a plurality of color groups, where each of the plurality of color groups includes at least one color.

If a color group includes at least two colors, all the colors in the color group are similar colors.

The colors in the target image may be divided into a plurality of color groups in a plurality of manners. The following describes an exemplary implementation.

Dividing the colors in the target image into a plurality of color groups may be implemented in the following manner: first, sorting each color in the target image in a preset arrangement order to obtain a color queue, where the preset arrangement order is a pre-generated arrangement order of colors; and dividing the color queue into a plurality of color groups based on a preset grouping method and a quantity of pixels of each color in the target image.

The following uses an example to describe how to divide the colors in the target image into a plurality of color groups.

Figure 7:
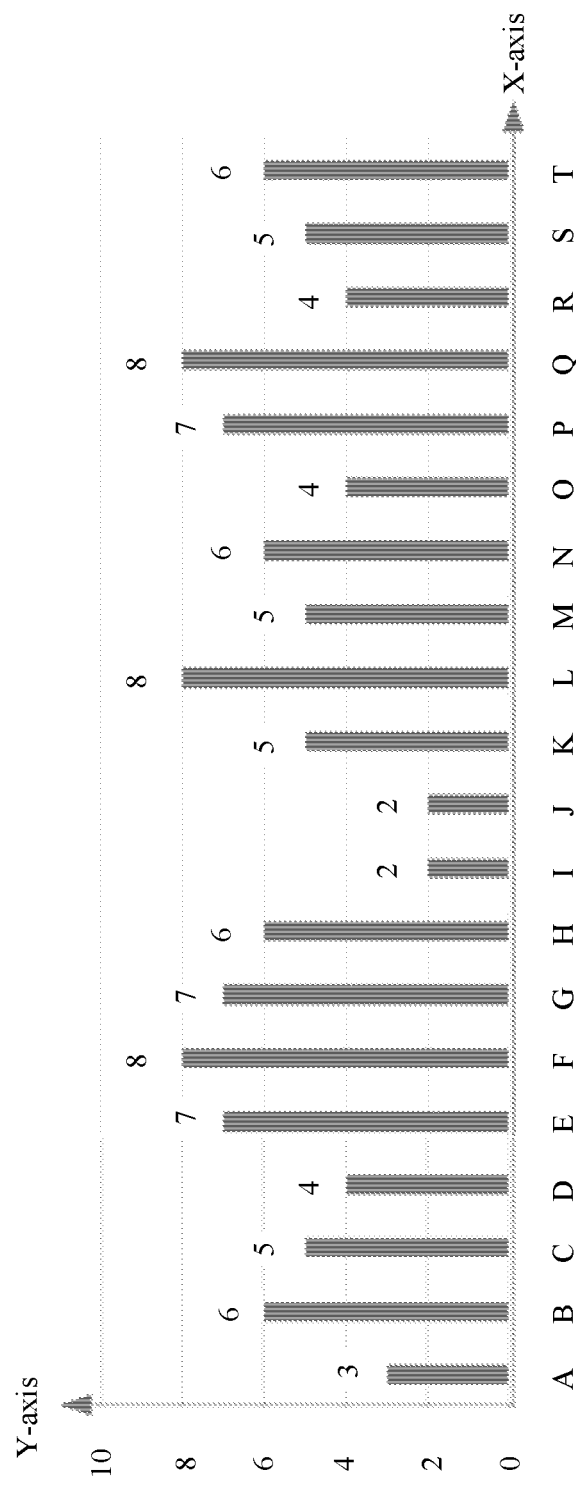
FIG. 7 is a schematic diagram of arrangement order of each color and a quantity of pixels of each color in a target image.
Figure 8:
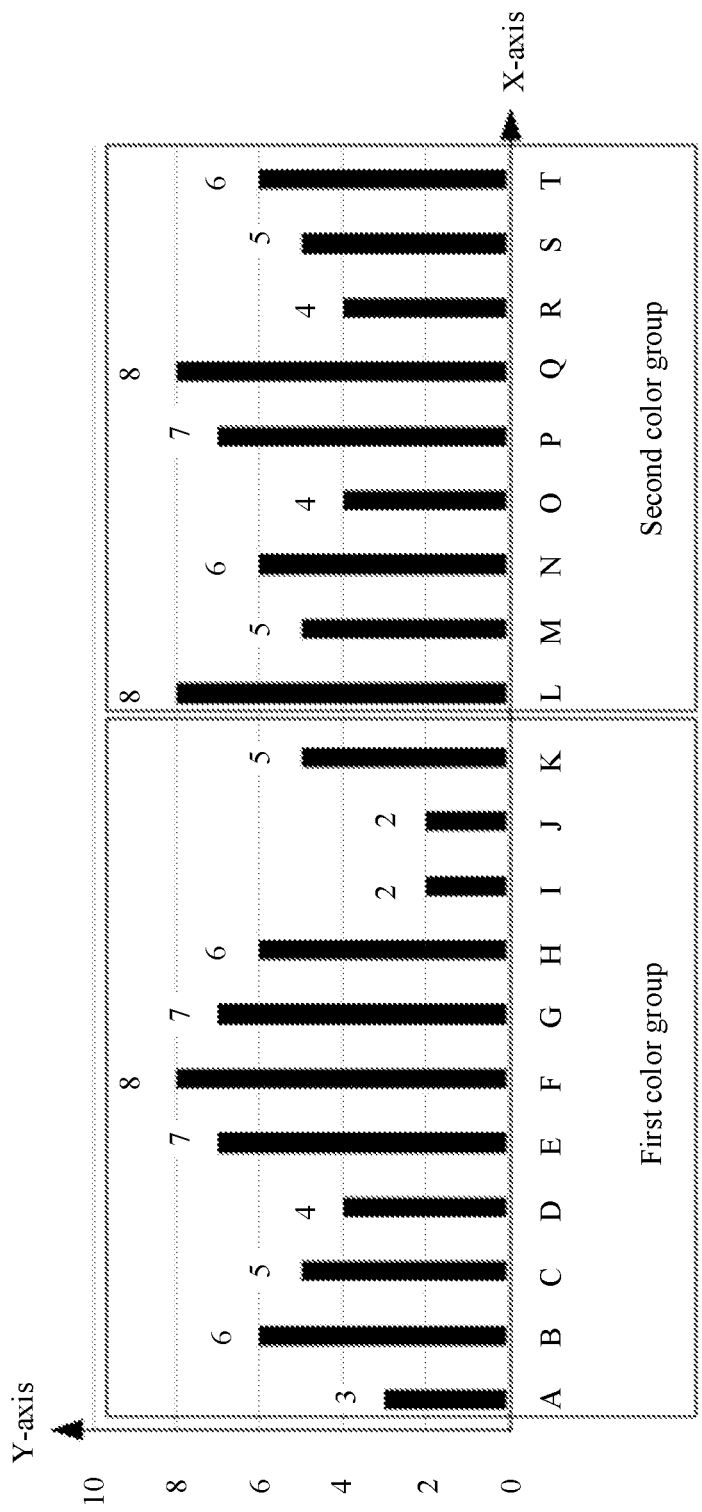
FIG. 8 is a schematic diagram of first grouping based on FIG. 7.
Figure 9:
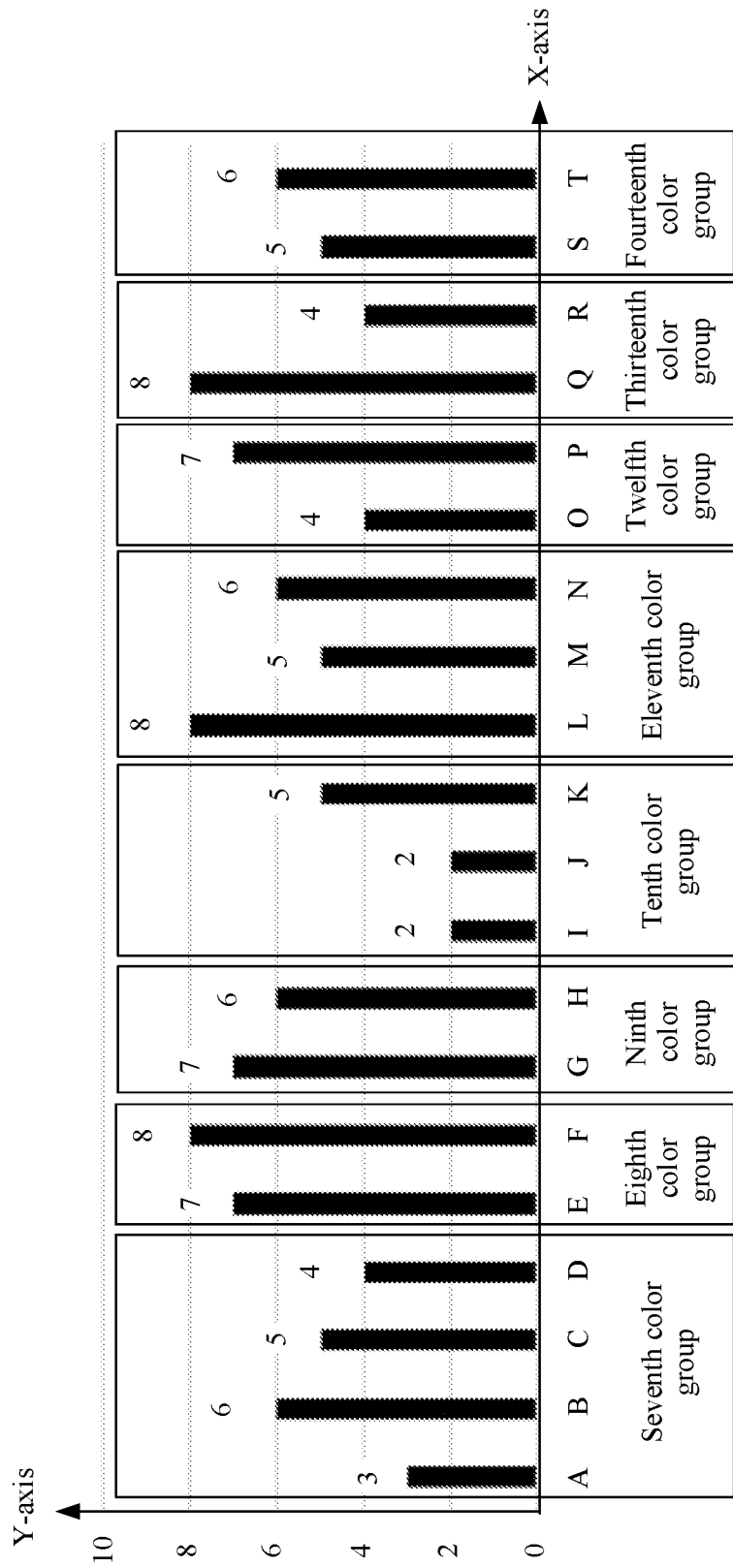
FIG. 9 is a schematic diagram of final grouping based on FIG. 7.

With reference to FIG. 7, FIG. 8, and FIG. 9, FIG. 7 is a schematic diagram of arrangement order of each color and the quantity of pixels of each color in the target image. Each letter (A to T) in an x-axis in FIG. 7 represents one color, and a number in a y-axis in FIG. 7 represents the quantity of pixels of each color. FIG. 8 is a schematic diagram of first grouping based on FIG. 7. FIG. 9 is a schematic diagram of final grouping based on FIG. 7.

For example, assuming that a size of the target image is 27 pixels×4 pixels, a quantity of pixels in the target image is 108, and the target image has 20 colors.

First, after the terminal obtains the 20 colors in the target image, the terminal may arrange the 20 colors in the target image in ascending order of angles of hues to obtain a color queue. The ascending order of the angles of the hues is 0 degrees to 359 degrees. The arrangement order of the 20 colors in the color queue is an arrangement order of 20 colors in the x-axis in FIG. 7.

Then the terminal needs to annotate the 20 colors in the color queue with quantities of pixels corresponding to the colors. To be specific, the color A has 3 pixels, the color B has 6 pixels, . . . , and the color T has 6 pixels.

Next, a binary search method is used to divide the color queue into a plurality of color groups. Specifically, starting from an origin on the x-axis in FIG. 7, the quantity of pixels of each color on the x-axis is accumulated until the accumulated quantity of pixels is greater than half the quantity of pixels in the target image; and by using a currently accumulated color as a dividing point, the 20 colors on the x-axis in FIG. 7 are divided into a first color group and a second color group. In FIG. 7, the quantity of pixels of each color on the x-axis is accumulated. When accumulation is performed from a quantity of pixels of the color A to a quantity of pixels of the color K, the accumulated quantity of pixels is 3+6+5+4+7+8+7+6+2+2+5=55, greater than 54. To be specific, the accumulated quantity of pixels is 55, greater than half the quantity 108 of pixels in the target image, that is, 54. In this case, the color A to the color K on the x-axis in FIG. 7 are used as the first color group, and the color L to the color T on the x-axis in FIG. 7 are used as the second color group. In this case, refer to an effect shown in FIG. 8. As shown in FIG. 8, the color queue is divided into two color groups, and the color groups are the first color group and the second color group.

If it is predetermined that the color queue is divided into a preset quantity of color groups, the binary search method may be used to continue to divide each color group, until a quantity of color groups resulting from division is the preset quantity.

For example, assuming that it is predetermined that the color queue is divided into eight color groups, the binary search method may be used to continue to divide the first color group into a third color group and a fourth color group and the binary search method is used to continue to divide the second color group into a fifth color group and a sixth color group. In this case, there are four color groups in total: the third color group, the fourth color group, the fifth color group, and the sixth color group. To obtain eight color groups, the binary search method still needs to be used to further divide each color group once. To be specific, the binary search method is used to divide the third color group into a seventh color group and an eighth color group, the binary search method is used to divide the fourth color group into a ninth color group and a tenth color group, the binary search method is used to divide the fifth color group into an eleventh color group and a twelfth color group, and the binary search method is used to divide the sixth color group into a thirteenth color group and a fourteenth color group.

With reference to FIG. 9, after the color queue is divided by using the binary search method for three times, eight color groups are finally obtained. The eight color groups include the seventh color group, the eighth color group, the ninth color group, the tenth color group, the eleventh color group, the twelfth color group, the thirteenth color group, and the fourteenth color group. The seventh color group includes the color A, the color B, the color C, and the color D. The eighth color group includes the color E and the color F. The ninth color group includes the color G and the color H. The tenth color group includes the color I, the color J, and the color K. The eleventh color group includes the color L, the color M, and the color N. The twelfth color group includes the color O and the color P. The thirteenth color group includes the color Q and the color R. The fourteenth color group includes the color S and the color T.

In the embodiments shown in FIG. 7, FIG. 8, and FIG. 9, the terminal divides the 20 colors in the target image into eight color groups. Certainly, the preset arrangement order is not limited to the ascending order of the angles of the hues that is already provided in this embodiment of this application. Alternatively, another arrangement order may be used. For example, the arrangement order may be descending order of the angles of the hues. In addition, the preset grouping method is not limited to the binary search method already provided in this embodiment of this application. Alternatively, another grouping method may be used.

At step S23: determine, in the plurality of color groups, a target color group having a largest quantity of pixels.

After the terminal divides the colors in the target image into the plurality of color groups, each color group has one or more colors, and a quantity of pixels of each color in each color group can be obtained. Therefore, the terminal can determine, in the plurality of color groups, the target color group having the largest quantity of pixels.

For example, with reference to FIG. 9, after the color queue is divided by using the binary search method for three times, eight color groups are finally obtained. The eight color groups include the seventh color group, the eighth color group, the ninth color group, the tenth color group, the eleventh color group, the twelfth color group, the thirteenth color group, and the fourteenth color group. As can be learned from FIG. 9, the seventh color group has 18 pixels, the eighth color group has 15 pixels, the ninth color group has 13 pixels, the tenth color group has 9 pixels, the eleventh color group has 19 pixels, the twelfth color group has 11 pixels, the thirteenth color group has 12 pixels, and the fourteenth color group has 11 pixels. It can be learned through comparison that in the eight color groups, the eleventh color group is the color group having the largest quantity of pixels, that is, the eleventh color group is the target color group.

At step S24: generate the first dominant color based on all colors in the target color group.

The first dominant color may be generated based on all the colors in the target color group in a plurality of manners. The following describes an exemplary implementation:

first, obtaining a three-channel red-green-blue value of each color in the target color group, where the three-channel red-green-blue value includes a red channel value, a green channel value, and a blue channel value; then calculating a target red channel value based on the red channel value of each color in the target color group and a ratio of a quantity of pixels of each color in the target color group to a quantity of pixels in the target color group; calculating a target green channel value based on the green channel value of each color in the target color group and the ratio of the quantity of pixels of each color in the target color group to the quantity of pixels in the target color group; calculating a target blue channel value based on the blue channel value of each color in the target color group and the ratio of the quantity of pixels of each color in the target color group to the quantity of pixels in the target color group; and finally combining the target red channel value, the target green channel value, and the target blue channel value into a target three-channel red-green-blue value to obtain the first dominant color.

For example, with reference to FIG. 9, the eleventh color group is the target color group, and the eleventh color group includes the color L, the color M, and the color N, where a quantity of pixels of the color L is 8, a quantity of pixels of the color M is 5, and a quantity of pixels of the color N is 6; therefore, the eleventh color group has 19 pixels. A red channel value of the color L, a red channel value of the color M, and a red channel value of the color N are respectively L (R), M (R), and N (R). A green channel value of the color L, a green channel value of the color M, and a green channel value of the color N are respectively L (G), M (G), and N (G). A blue channel value of the color L, a blue channel value of the color M, and a blue channel value of the color N are respectively L (B), M (B), and N (B).

Target red channel value=L (R)×8/(8+5+6)+M (R)×5/(8+5+6)+N (R)×6/(8+5+6). Target green channel value=L (G)×8/(8+5+6)+M (G)×5/(8+5+6)+N (G)×6/(8+5+6). Target blue channel value=L (B)×8/(8+5+6)+M (B)×5/(8+5+6)+N(B)×6/(8+5+6).

8/(8+5+6) is a ratio of the quantity of pixels of the color L to the quantity of pixels in the eleventh color group, that is, a ratio of the quantity of pixels of the color L to the quantity of pixels in the target color group. 5/(8+5+6) is a ratio of the quantity of pixels of the color M to the quantity of pixels in the eleventh color group, that is, a ratio of the quantity of pixels of the color M to the quantity of pixels in the target color group. 6/(8+5+6) is a ratio of the quantity of pixels of the color N to the quantity of pixels in the eleventh color group, that is, a ratio of the quantity of pixels of the color N to the quantity of pixels in the target color group.

Finally, the target red channel value, the target green channel value, and the target blue channel value are combined into the target three-channel red-green-blue value (that is, these values are directly used as the target three-channel red-green-blue value), and the target three-channel red-green-blue value is used as a three-channel red-green-blue value of the first dominant color.

For example, it is assumed that the target red channel value is 255, that the target green channel value is 100, and that the target blue channel value is 50. The target red channel value 255, the target green channel value 100, and the target blue channel value 50 are combined into the target three-channel red-green-blue value (255, 100, 50), and the target three-channel red-green-blue value (255, 100, 50) is used as the three-channel red-green-blue value of the first dominant color. In this case, the three-channel red-green-blue value of the first dominant color is (255, 100, 50).

In FIG. 6, this embodiment of this application provides a method for generating the first dominant color. In the plurality of color groups, the target color group is the color group having the largest quantity of pixels. Therefore, if the target color group includes at least two similar colors, the first dominant color generated based on all the colors in the target color group can better reflect the main color in the target image.

Figure 10:
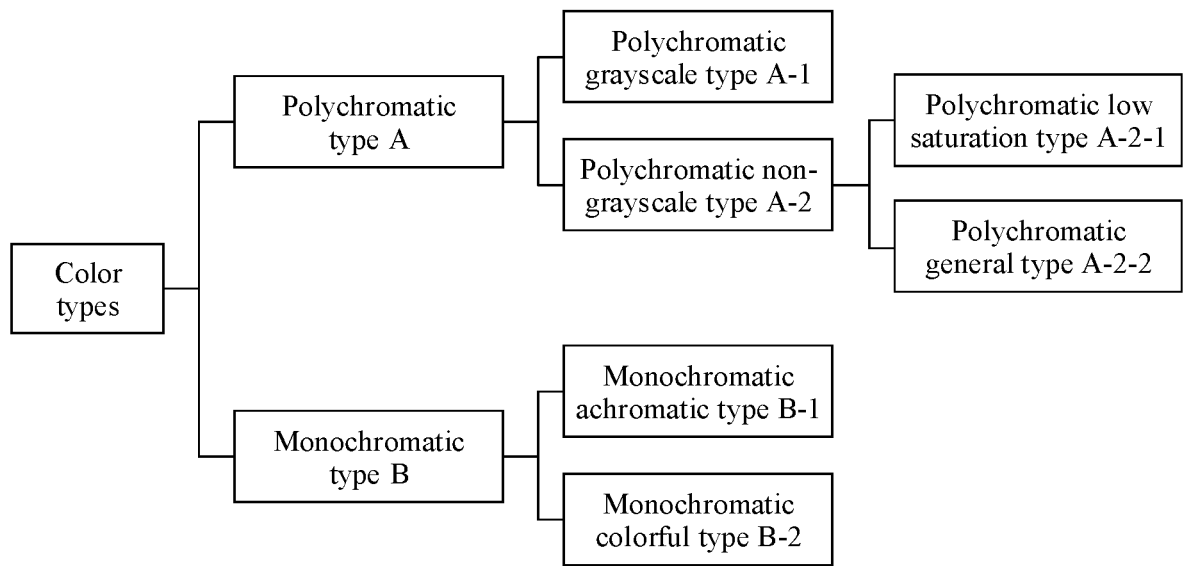
FIG. 10 is a schematic diagram of classification of color types according to an embodiment of this application.

FIG. 10 is a schematic diagram of classification of color types according to an embodiment of this application. This embodiment of this application provides a plurality of color types. The following briefly describes the color types provided in this embodiment of this application.

In FIG. 10, the color types include a polychromatic type A and a monochromatic type B. The polychromatic type A includes a polychromatic grayscale type A-1 and a polychromatic non-grayscale type A-2. The polychromatic non-grayscale type A-2 includes a polychromatic low saturation type A-2-1 and a polychromatic general type A-2-2. The monochromatic type B includes a monochromatic achromatic type B-1 and a monochromatic colorful type B-2.

The polychromatic type A is used to indicate that a ratio of a quantity of pixels corresponding to a first dominant color in a target image to a quantity of pixels corresponding to the target image is less than a first threshold. The first threshold is a preset value. For example, the first threshold may be 90%. The polychromatic type is divided into the polychromatic grayscale type A-1 and the polychromatic non-grayscale type A-2 based on a ratio of a quantity of pixels corresponding to colors having a same three-channel red-green-blue value in the target image to the quantity of pixels corresponding to the target image.

The polychromatic grayscale type A-1 is used to indicate that the ratio of the quantity of pixels corresponding to the first dominant color in the target image to the quantity of pixels corresponding to the target image is less than the first threshold, and the ratio of the quantity of pixels corresponding to the colors having the same three-channel red-green-blue value in the target image to the quantity of pixels corresponding to the target image is greater than a second threshold. The second threshold is a preset value. For example, the second threshold may be 90%.

The polychromatic non-grayscale type A-2 is used to indicate that the ratio of the quantity of pixels corresponding to the first dominant color in the target image to the quantity of pixels corresponding to the target image is less than the first threshold, and the ratio of the quantity of pixels corresponding to the colors having the same three-channel red-green-blue value in the target image to the quantity of pixels corresponding to the target image is less than the second threshold. The second threshold is a preset value. For example, the second threshold may be 90%. The polychromatic non-grayscale type A-2 includes the polychromatic low saturation type A-2-1 and the polychromatic general type A-2-2.

The polychromatic low saturation type A-2-1 is used to indicate that the ratio of the quantity of pixels corresponding to the first dominant color in the target image to the quantity of pixels corresponding to the target image is less than the first threshold, and the ratio of the quantity of pixels corresponding to the colors having the same three-channel red-green-blue value in the target image to the quantity of pixels corresponding to the target image is less than the second threshold, and saturation of the first dominant color is less than a third threshold. The third threshold is a preset value. For example, the third threshold may be 10%.

The polychromatic general type A-2-2 is used to indicate that the ratio of the quantity of pixels corresponding to the first dominant color in the target image to the quantity of pixels corresponding to the target image is less than the first threshold, and the ratio of the quantity of pixels corresponding to the colors having the same three-channel red-green-blue value in the target image to the quantity of pixels corresponding to the target image is less than the second threshold, and the saturation of the first dominant color is greater than the third threshold.

The monochromatic type B is used to indicate that the ratio of the quantity of pixels corresponding to the first dominant color in the target image to the quantity of pixels corresponding to the target image is greater than the first threshold. The monochromatic type B includes the monochromatic achromatic type B-1 and the monochromatic colorful type B-2.

The monochromatic achromatic type B-1 is used to indicate that the ratio of the quantity of pixels corresponding to the first dominant color in the target image to the quantity of pixels corresponding to the target image is greater than the first threshold, and the saturation of the first dominant color is equal to 0.

The monochromatic colorful type B-2 is used to indicate that the ratio of the quantity of pixels corresponding to the first dominant color in the target image to the quantity of pixels corresponding to the target image is greater than the first threshold, and the saturation of the first dominant color is greater than 0.

With reference to FIG. 6, after step S24, that is, after the terminal generates the first dominant color based on all the colors in the target color group, the terminal may further generate more dominant colors, and more dominant colors may provide a user with more options. More dominant colors may be generated in a plurality of manners. The following describes three manners of generating a second dominant color.

First manner: when the color type of the target image is the polychromatic type, determine, in the plurality of color groups, a specified color group having a second largest quantity of pixels, and generate the second dominant color based on all colors in the specified color group.

In the first manner, if the color type of the target image is the polychromatic type, the terminal may find, in the plurality of color groups resulting from division, the specified color group having the second largest quantity of pixels. Finally, the second dominant color is generated based on all the colors in the specified color group. For the implementation of generating the second dominant color based on all the colors in the specified color group, refer to the implementation of generating the first dominant color based on all the colors in the target color group in step S24.

For example, with reference to FIG. 9, when the color type of the target image is the polychromatic type, the terminal determines, in the eight color groups, the seventh color group having a second largest quantity of pixels, and then the terminal generates the second dominant color based on the color A, the color B, the color C, and the color D in the seventh color group.

Second manner: when the color type of the target image is the monochromatic colorful type, obtain a second dominant color adjustment value corresponding to the monochromatic colorful type, and configure a hue of the first dominant color based on the second dominant color adjustment value to generate the second dominant color.

In the second manner, if the color type of the target image is the monochromatic colorful type, the terminal obtains the second dominant color adjustment value corresponding to the monochromatic colorful type, and configures the hue of the first dominant color based on the second dominant color adjustment value to generate the second dominant color.

For example, it is assumed that the first dominant color is red, and the hue of the first dominant color is 0 degrees, and saturation of the first dominant color is 100%, and brightness of the first dominant color is 100%. When the color type of the target image is the monochromatic colorful type, the terminal obtains the second dominant color adjustment value corresponding to the monochromatic colorful type. Assuming that the second dominant color adjustment value corresponding to the monochromatic colorful type is to increase the hue of the first dominant color by 180 degrees, the terminal configures the hue of the first dominant color based on the second dominant color adjustment value to generate the second dominant color, where a hue of the obtained second dominant color is 180 degrees, saturation of the second dominant color is 100%, and brightness of the second dominant color is 100%. In this case, the second dominant color is light cyan.

Third manner: when the color type of the target image is the monochromatic achromatic type, obtain a second dominant color adjustment value corresponding to the monochromatic achromatic type, and configure brightness of the first dominant color based on the second dominant color adjustment value to generate the second dominant color.

In the third manner, if the color type of the target image is the monochromatic achromatic type, the terminal obtains the second dominant color adjustment value corresponding to the monochromatic achromatic type, and configures brightness of the first dominant color based on the second dominant color adjustment value to generate the second dominant color.

For example, assuming that the ratio of the quantity of pixels of the first dominant color of the target image in the target image to the quantity of pixels corresponding to the target image is greater than 90%, and the saturation of the first dominant color is equal to 0, it indicates that the color type of the target image is the monochromatic achromatic type. Assuming that the first dominant color is black, and the hue of the first dominant color is 0 degrees, and the saturation of the first dominant color is 0%, and the brightness of the first dominant color is 0%, when the color type of the target image is the monochromatic achromatic type, the terminal obtains the second dominant color adjustment value corresponding to the monochromatic achromatic type. Assuming that the second dominant color adjustment value corresponding to the monochromatic achromatic type is to increase the brightness of the first dominant color by 20%, the terminal configures the hue of the first dominant color based on the second dominant color adjustment value to generate the second dominant color, where a hue of the obtained the second dominant color is 0 degrees, saturation of the second dominant color is 0%, and brightness of the second dominant color is 20%.

For another example, assuming that the ratio of the quantity of pixels of the first dominant color of the target image in the target image to the quantity of pixels corresponding to the target image is greater than 90%, and the saturation of the first dominant color is equal to 0, it indicates that the color type of the target image is the monochromatic achromatic type. Assuming that the first dominant color is white, and the hue of the first dominant color is 0 degrees, and the saturation of the first dominant color is 0%, and the brightness of the first dominant color is 100%, when the color type of the target image is the monochromatic achromatic type, the terminal obtains the second dominant color adjustment value corresponding to the monochromatic achromatic type. Assuming that the second dominant color adjustment value corresponding to the monochromatic achromatic type is to decrease the brightness of the first dominant color by 20%, the terminal configures the hue of the first dominant color based on the second dominant color adjustment value to generate the second dominant color, where a hue of the obtained the second dominant color is 0 degrees, saturation of the second dominant color is 0%, and brightness of the second dominant color is 80%.

For another example, assuming that the ratio of the quantity of pixels of the first dominant color of the target image in the target image to the quantity of pixels corresponding to the target image is greater than 90%, and the saturation of the first dominant color is equal to 0, it indicates that the color type of the target image is the monochromatic achromatic type. Assuming that the first dominant color is gray, and the hue of the first dominant color is 0 degrees, and the saturation of the first dominant color is 0%, and the brightness of the first dominant color is 50%, when the color type of the target image is the monochromatic achromatic type, the terminal obtains the second dominant color adjustment value corresponding to the monochromatic achromatic type. Assuming that the second dominant color adjustment value corresponding to the monochromatic achromatic type is to decrease the brightness of the first dominant color by 25%, the terminal configures the hue of the first dominant color based on the second dominant color adjustment value to generate the second dominant color, where a hue of the obtained the second dominant color is 0 degrees, saturation of the second dominant color is 0%, and brightness of the second dominant color is 25%.

After the second dominant color is generated, a second auxiliary color may be further generated based on a dominant color adjustment parameter and the second dominant color. Specifically, the terminal needs to first obtain a dominant color adjustment parameter corresponding to the color type of the target image, where the dominant color adjustment parameter includes at least one of brightness and saturation; then the terminal adjusts the second dominant color based on the dominant color adjustment parameter to generate a second bright auxiliary color and a second dark auxiliary color; and next, the terminal determines the second bright auxiliary color or the second dark auxiliary color as the second auxiliary color, where the second auxiliary color is a color with a hue close to that of the second dominant color but with a difference in saturation or brightness, and being close in hue means that an absolute value of hue difference between the second dominant color and the second auxiliary color is less than a threshold. For example, the threshold may be 30 degrees.

Figure 12:
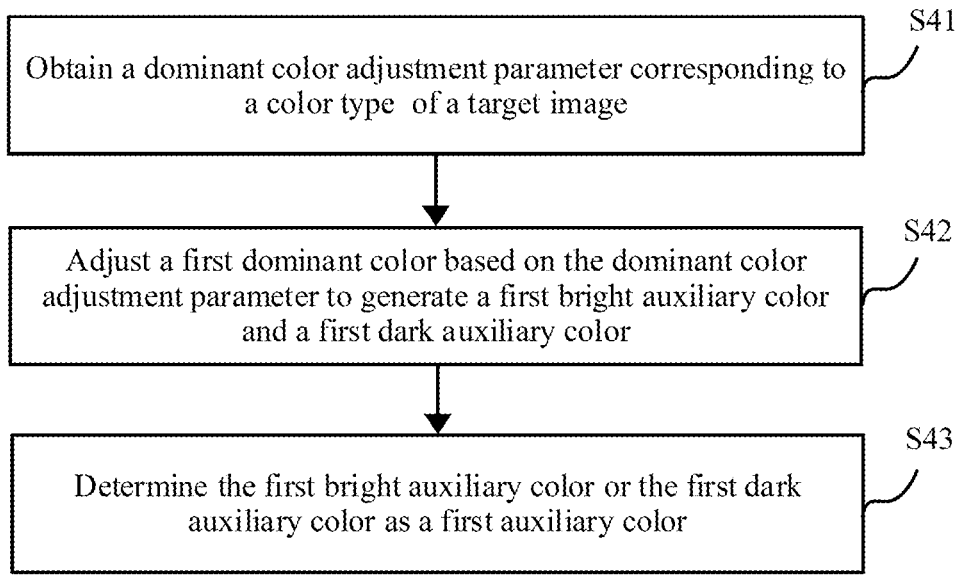
FIG. 12 is a flowchart of still another interface element color display method according to an embodiment of this application.

An exemplary process in which the terminal obtains the dominant color adjustment parameter corresponding to the color type of the target image is similar to step S41 in an embodiment shown in FIG. 12. Refer to detailed descriptions in step S41 in the embodiment shown in FIG. 12. That the terminal adjusts the second dominant color based on the dominant color adjustment parameter to generate a second bright auxiliary color and a second dark auxiliary color is similar to step S42 in the embodiment shown in FIG. 12. Refer to detailed descriptions in step S42 in the embodiment shown in FIG. 12. That the terminal determines the second bright auxiliary color or the second dark auxiliary color as the second auxiliary color is similar to step S43 in the embodiment shown in FIG. 12. Refer to detailed descriptions in step S43 in the embodiment shown in FIG. 12.

After the terminal adjusts the second dominant color based on the dominant color adjustment parameter to generate the second auxiliary color, if the user wishes to set the second auxiliary color as a color of a foreground element, the user may enter an instruction to the terminal. When the terminal receives the instruction entered by the user for setting the second auxiliary color as the color of the foreground element, the terminal sets the second auxiliary color as the color of the foreground element. Therefore, more options can be provided for the user.

After the terminal sets the second auxiliary color as the color of the foreground element, to better highlight the foreground element in the target image, the terminal may further add a background layer on a background element, so that the background layer is located between the target image and the foreground element, where the background layer may be a layer with unchanged transparency or a layer with gradient transparency.

Because the background layer is located between the target image and the foreground element, the background layer may be used to set off the foreground element and further highlight the foreground element. Moreover, the hue of the second dominant color is close to the hue of the second auxiliary color, and there is good color fusion between a color of the background layer and the color of the foreground element. In addition, because there is a difference between the second dominant color and the second auxiliary color in saturation or brightness, there is also good contrast between the second dominant color and the second auxiliary color, and there is good contrast between the color of the background layer and the color of the foreground element. Therefore, when the user browses the to-be-displayed interface, the user has strong immersive experience.

With reference to FIG. 6, after step S23 and before step S24, the method may further include the following step: determining whether the color type of the target image is the polychromatic grayscale type or the polychromatic low saturation type; and when the color type of the target image is the polychromatic grayscale type or the polychromatic low saturation type, converting colors having different three-channel red-green-blue values in the target color group into colors having a same three-channel red-green-blue value, and then performing step S24; or when the color type of the target image is not the polychromatic grayscale type or the polychromatic low saturation type, performing step S24.

After step S23, that is, after the terminal determines, in the plurality of color groups, the target color group having the largest quantity of pixels, the terminal needs to determine whether the color type of the target image is the polychromatic grayscale type or the polychromatic low saturation type. If the color type of the target image is the polychromatic grayscale type, it indicates that the ratio of the quantity of pixels corresponding to the colors having the same three-channel red-green-blue value in the target image to the quantity of pixels corresponding to the target image is greater than the second threshold, that is, colors of a majority of pixels in the target image are black, white, or gray. To ensure that the generated first dominant color complies with a dominant tone of the target image, the terminal performs decoloring processing on colored pixels in the target color group, so that the colored pixels in the target color group are converted into black, white, or gray.

Likewise, if the color type of the target image is the polychromatic low saturation type, it indicates that saturation of a majority of pixels in the target image is low. Therefore, the target image is more likely to be black, white, or gray. To ensure that the generated first dominant color complies with the dominant tone of the target image, the terminal performs decoloring processing on the colored pixels in the target color group, so that the colored pixels in the target color group are converted into black, white, or gray.

The colors having different three-channel red-green-blue values in the target color group may be converted, in a plurality of manners, into the colors having the same three-channel red-green-blue value, that is, there are a plurality of decoloring processing methods. The following briefly describes one manner.

For example, a decoloring processing formula=R*0.299+ G*0.587+B*0.114 may be used. It is assumed that 10 pixels exist in the target color group, where colors of nine of the 10 pixels are black, white, or gray, that is, three-channel red-green-blue values of the nine pixels are the same, a color of one of the 10 pixels is red, and a three-channel red-green-blue value of the red target pixel is (255, 0, 0). When the terminal determines that the color type of the target image is the polychromatic grayscale type or the polychromatic low saturation type, the terminal converts the colors having different three-channel red-green-blue values in the target color group into the colors having the same three-channel red-green-blue value. To be specific, by using the decoloring processing formula, the terminal converts the red target pixel into a color having the same three-channel red-green-blue value. Specifically, because the three-channel red-green-blue value of the red target pixel is (255, 0, 0), that is, R=255, G=0, and B=0, decoloring processing formula=R*0.299+G*0.587+B*0.114=255*0.299+ 0*0.587+0*0.114=76.245 76, and 76 is used as the three-channel red-green-blue value of the target pixel, that is, the three-channel red-green-blue value of the target pixel is (76, 76, 76). In this case, the target pixel is gray.

Figure 11:
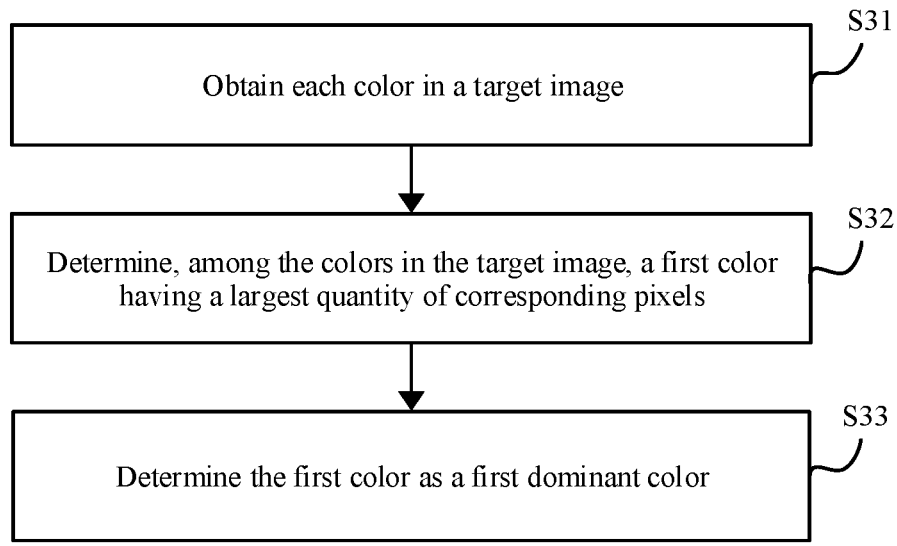
FIG. 11 is a flowchart of still another interface element color display method according to an embodiment of this application.

FIG. 11 is a flowchart of still another interface element color display method according to an embodiment of this application. The embodiment shown in FIG. 11 is an exemplary implementation of step S121 in FIG. 2, that is, the embodiment shown in FIG. 11 is how to determine a first dominant color of a target image. The method shown in FIG. 11 includes the following steps.

At step S31: obtain each color in a target image.

At step S32: determine, among the colors in the target image, a first color having a largest quantity of corresponding pixels.

At step S33: determine the first color as a first dominant color.

In step S31 to step S33, after a terminal obtains a target image included in a to-be-displayed interface, the terminal needs to first obtain each color in the target image, so that the terminal determines, among the colors in the target image, a first color having a largest quantity of pixels and can finally use the first color as a first dominant color.

For example, it is assumed that there are three colors in total in the target image, which are a color A, a color B, and a color C respectively, where the color A in the target image has 200 pixels, the color B in the target image has 150 pixels, and the color C in the target image has 100 pixels. The terminal may determine, among the three colors in the target image, that a color having a largest quantity of corresponding pixels is the color A. In this case, the terminal determines the color A as the first dominant color.

In the embodiment shown in FIG. 11, after step S33, that is, after the first color is determined as the first dominant color, the following manner may be further used to obtain a second dominant color: first determining, among the colors in the target image, a second color having a second largest quantity of corresponding pixels; and then determining the second color as the second dominant color.

For example, it is assumed that there are three colors in total in the target image, which are a color A, a color B, and a color C respectively, where the color A in the target image has 200 pixels, the color B in the target image has 150 pixels, and the color C in the target image has 100 pixels. The terminal may determine, among the three colors in the target image, that a color having a largest quantity of corresponding pixels is the color A, and the terminal may further determine, among the three colors in the target image, that a color having a second largest quantity of corresponding pixels is the color B. In this case, the terminal determines the color B as the second dominant color.

FIG. 12 is a flowchart of still another interface element color display method according to an embodiment of this application. The embodiment shown in FIG. 12 is an exemplary implementation of step S122 in FIG. 2, that is, the embodiment shown in FIG. 12 is how to determine a first auxiliary color based on a color type. The method shown in FIG. 12 includes the following steps.

At step S41: obtain a dominant color adjustment parameter corresponding to a color type of a target image, where the dominant color adjustment parameter includes at least one of brightness and saturation.

Different color types correspond to different dominant color adjustment parameters. There are a plurality of cases of obtaining the dominant color adjustment parameter corresponding to the color type of the target image. The following describes two cases.

First case: when the color type of the target image is a polychromatic general type or a monochromatic colorful type, obtain a first brightness adjustment value, a second brightness adjustment value, a first saturation adjustment value, and a second saturation adjustment value corresponding to the polychromatic general type or the monochromatic colorful type.

In the first case, the first brightness adjustment value and the second brightness adjustment value are separately used to adjust brightness of a dominant color, the first saturation adjustment value and the second saturation adjustment value are separately used to adjust saturation of the dominant color, and the dominant color adjustment parameter includes the first brightness adjustment value, the second brightness adjustment value, the first saturation adjustment value, and the second saturation adjustment value.

For example, referring to Table 1 and FIG. 10, Table 1 shows a mapping relationship between the color type and the dominant color adjustment parameter. As can be learned from Table 1, if the color type is a polychromatic general type A-2-2 or a monochromatic colorful type B-2, the dominant color adjustment parameter corresponding to the color type includes the first brightness adjustment value, the second brightness adjustment value, the first saturation adjustment value, and the second saturation adjustment value, where the first brightness adjustment value is 1.0, the first saturation adjustment value is 0.2, the second brightness adjustment value is 0.2, and the second saturation adjustment value is 1.0.

TABLE 1

| Color type | Dominant color adjustment parameter | | | |
| --- | --- | --- | --- | --- |
| | First brightness adjustment value | First saturation adjustment value | Second brightness adjustment value | Second saturation adjustment value |
| Polychromatic general type A-2-2 Monochromatic colorful type B-2 | 1.0 | 0.2 | 0.2 | 1.0 |

Second case: when the color type of the target image is a polychromatic low saturation type, a polychromatic grayscale type, or a monochromatic achromatic type, obtain a first brightness adjustment value and a second brightness adjustment value corresponding to the polychromatic low saturation type, the polychromatic grayscale type, or the monochromatic achromatic type.

In the second case, the first brightness adjustment value and the second brightness adjustment value are separately used to adjust brightness of a dominant color, and the dominant color adjustment parameter includes the first brightness adjustment value and the second brightness adjustment value.

For example, referring to Table 2 and FIG. 10, Table 2 shows a mapping relationship between the color type and the dominant color adjustment parameter. As can be learned from Table 2, if the color type is a polychromatic low saturation type A-2-1, a polychromatic grayscale type A-1, or a monochromatic achromatic type B-1, the dominant color adjustment parameter corresponding to the color type includes the first brightness adjustment value and the second brightness adjustment value, where the first brightness adjustment value is 1.0, and the second brightness adjustment value is 0.2.

TABLE 2

| Color type | Dominant color adjustment parameter | | | |
| --- | --- | --- | --- | --- |
| | First brightness adjustment value | First saturation adjustment value | Second brightness adjustment value | Second saturation adjustment value |
| Polychromatic low saturation type A-2-1 Polychromatic grayscale type A-1 Monochromatic achromatic type B-1 | 1.0 | Null | 0.2 | Null |

At step S42: adjust a first dominant color based on the dominant color adjustment parameter to generate a first bright auxiliary color and a first dark auxiliary color.

When the color type of the target image is the polychromatic general type or the monochromatic colorful type, the terminal obtains the first brightness adjustment value, the second brightness adjustment value, the first saturation adjustment value, and the second saturation adjustment value corresponding to the polychromatic general type or the monochromatic colorful type; and then the terminal adjusts brightness and saturation of the first dominant color based on the first brightness adjustment value and the first saturation adjustment value to generate the first bright auxiliary color, and adjusts brightness and saturation of the first dominant color based on the second brightness adjustment value and the second saturation adjustment value to generate the first dark auxiliary color.

With reference to Table 1 and FIG. 10, for example, if the color type is the polychromatic general type A-2-2 or the monochromatic colorful type B-2, the dominant color adjustment parameter corresponding to the color type includes the first brightness adjustment value, the second brightness adjustment value, the first saturation adjustment value, and the second saturation adjustment value, where the first brightness adjustment value is 1.0, the first saturation adjustment value is 0.2, the second brightness adjustment value is 0.2, and the second saturation adjustment value is 1.0. After the terminal obtains the four adjustment values, the terminal adjusts brightness and saturation of the first dominant color based on the first brightness adjustment value 1.0 and the first saturation adjustment value 0.2 to generate the first bright auxiliary color, and adjusts brightness and saturation of the first dominant color based on the second brightness adjustment value 0.2 and the second saturation adjustment value 1.0 to generate the first dark auxiliary color, thereby obtaining two auxiliary colors.

When the color type of the target image is the polychromatic low saturation type, the polychromatic grayscale type, or the monochromatic achromatic type, the terminal obtains the first brightness adjustment value and the second brightness adjustment value corresponding to the polychromatic low saturation type, the polychromatic grayscale type, or the monochromatic achromatic type; and then the terminal adjusts brightness of the first dominant color based on the first brightness adjustment value to generate the first bright auxiliary color, and adjusts brightness of the first dominant color based on the second brightness adjustment value to generate the first dark auxiliary color.

With reference to Table 2 and FIG. 10, for example, if the color type is the polychromatic low saturation type A-2-1, the polychromatic grayscale type A-1, or the monochromatic achromatic type B-1, the dominant color adjustment parameter corresponding to the color type includes the first brightness adjustment value and the second brightness adjustment value, where the first brightness adjustment value is 1.0, and the second brightness adjustment value is 0.2. After the terminal obtains the two adjustment values, the terminal adjusts brightness of the first dominant color based on the first brightness adjustment value 1.0 to generate the first bright auxiliary color, and adjusts brightness of the first dominant color based on the second brightness adjustment value 0.2 to generate the first dark auxiliary color, thereby obtaining two auxiliary colors.

At step S43: determine the first bright auxiliary color or the first dark auxiliary color as a first auxiliary color.

In step S43, the first bright auxiliary color or the first dark auxiliary color may be determined as the first auxiliary color in the following manner: first, the terminal determines whether a ratio of a brightness differentiation parameter of the first dominant color to a brightness differentiation parameter of the first bright auxiliary color is greater than a fourth threshold or less than a reciprocal of the fourth threshold; and when the ratio of the brightness differentiation parameter of the first dominant color to the brightness differentiation parameter of the first bright auxiliary color is greater than the fourth threshold or less than the reciprocal of the fourth threshold, the terminal determines the first bright auxiliary color as the first auxiliary color; or when the ratio of the brightness differentiation parameter of the first dominant color to the brightness differentiation parameter of the first bright auxiliary color is less than the fourth threshold or greater than the reciprocal of the fourth threshold, the terminal determines the first dark auxiliary color as the first auxiliary color.

The brightness differentiation parameter of the first bright auxiliary color is greater than a brightness differentiation parameter of the first dark auxiliary color, the brightness differentiation parameter of the first dominant color is obtained through calculation based on a three-channel red-green-blue value of the first dominant color, the brightness differentiation parameter of the first bright auxiliary color is obtained through calculation based on a three-channel red-green-blue value of the first bright auxiliary color, and the brightness differentiation parameter of the first dark auxiliary color is obtained through calculation based on a three-channel red-green-blue value of the first dark auxiliary color.

If the ratio of the brightness differentiation parameter of the first dominant color to the brightness differentiation parameter of the first bright auxiliary color is greater than the fourth threshold or less than the reciprocal of the fourth threshold, which indicates that contrast between the first dominant color and the first bright auxiliary color is appropriate, the terminal determines the first bright auxiliary color as the first auxiliary color, so that there is good contrast between a color of a foreground element and a color of the target image; or if the ratio of the brightness differentiation parameter of the first dominant color to the brightness differentiation parameter of the first bright auxiliary color is less than the fourth threshold or greater than the reciprocal of the fourth threshold, which indicates that contrast between the first dominant color and the first bright auxiliary color is not appropriate, the terminal determines the first dark auxiliary color as the first auxiliary color, so that there is good contrast between a color of a foreground element and a color of the target image.

A brightness differentiation parameter of a color may be obtained in a plurality of manners. The following describes an exemplary implementation.

At step 1: obtain a three-channel red-green-blue value of a target color.

At step 2: separately calculate ratios of a red channel value, a green channel value, and a blue channel value to 255.

At step 3: determine whether the ratio of the red channel value to 255 is less than a target value; and if yes, obtain a target red channel value by calculating the ratio of the three-channel red-green-blue value of the target color to 255 by using a first formula; or if no, obtain a target red channel value by calculating the ratio of the three-channel red-green-blue value of the target color to 255 by using a second formula.

For the green channel value of the target color and the blue channel value of the target color, a manner same as the manner of determining and calculating the red channel value of the target color is used, and further, a target green channel value and a target blue channel value are obtained.

At step 4: obtain a brightness differentiation parameter of the target color by calculating the target red channel value, the target green channel value, and the target blue channel value by using a third formula.

For example, it is assumed that the target value is 0.03928. First, the terminal obtains the three-channel red-green-blue value of the target color, which is (255, 0, 0), that is, a red channel value R1 of the target color is 255, a green channel value G1 of the target color is 0, and a blue channel value B1 of the target color is 0. Then the terminal calculates a ratio R2 of the red channel value R1 of the target color to 255, where $R2=255 \div 255=1$, a ratio G2 of the green channel value of the target color to 255, where $G2=0 \div 255=0$, and a ratio B2 of the blue channel value of the target color to 255, where $B2=0 \div 255=0$. Next, the terminal determines whether R2 is less than the target value 0.03928. The terminal may learn, by determining, that R2 is greater than the target value 0.03928. In this case, the terminal calculates the target red channel value R3 by using a formula $((R2+0.055) \div 1.055)$ 2.4, where through calculation, $R3=((R2+0.055) \div 1.055)$ $2.4=((1+0.055) \div 1.055)$ $2.4=1$. The terminal further determines whether G2 is less than the target value 0.03928. The terminal may learn, by determining, that G2 is less than the target value 0.03928. In this case, the terminal calculates the target green channel value G3 by using a formula $G2 \div 12.92$, where through calculation, $G3=G2 \div 12.92=0 \div 12.92=0$. The terminal further determines whether B2 is less than the target value 0.03928. The terminal may learn, by determining, that B2 is less than the target value 0.03928. In this case, the terminal calculates the target blue channel value B3 by using a formula $B2 \div 12.92$, where through calculation, $B3=B2 \div 12.92=0 \div 12.92=0$. After the terminal obtains the target red channel value R3, the target green channel value G3, and the target blue channel value B3, the terminal obtains a brightness differentiation parameter L of the target color by performing calculation on the target red channel value R3, the target green channel value G3, and the target blue channel value B3, where through calculation, $L=0.2126 \times R3+0.7152 \times G3+0.0722 \times B3=0.2126 \times 1+0.7152 \times 0+0.0722 \times 0=1+0+0=1$. In this case, the terminal obtains the brightness differentiation parameter L of the target color.

Certainly, a manner of calculating a brightness differentiation parameter of a color is not limited to the provided manner, and other manners may also be used. The manner of calculating a brightness differentiation parameter of a color may be used to separately calculate the brightness differentiation parameter of the first dominant color, the brightness differentiation parameter of the first bright auxiliary color, and the brightness differentiation parameter of the first dark auxiliary color.

Figure 13:
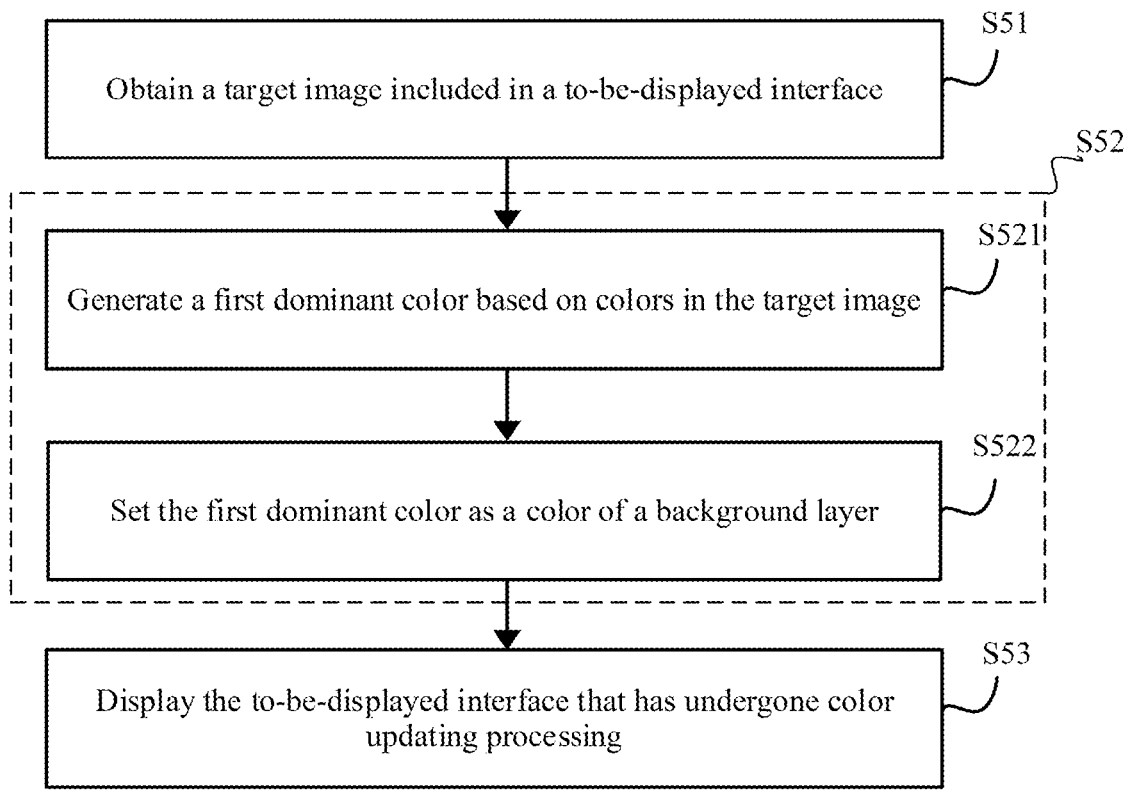
FIG. 13 is a flowchart of still another interface element color display method according to an embodiment of this application.

FIG. 13 is a flowchart of still another interface element color display method according to an embodiment of this application. The method shown in FIG. 13 includes the following steps.

At step S51: obtain a target image included in a to-be-displayed interface.

The to-be-displayed interface includes a background element, the background element includes the target image and a background layer, and the target image is used as a background of the background layer.

For an exemplary manner of step S51, refer to detailed descriptions in step S11 shown in FIG. 2.

At step S52: perform color updating processing on the to-be-displayed interface.

After a terminal obtains a target image included in a to-be-displayed interface, the terminal needs to first generate a first dominant color based on colors in the target image, and then the terminal sets the first dominant color as a color of a background layer, to complete color updating processing on the to-be-displayed interface. Performing color updating processing on the to-be-displayed interface by the terminal may include step S521 and step S522.

At step S521: generate a first dominant color based on colors in the target image.

The first dominant color is a main color in the target image.

For an exemplary manner of step S521, refer to detailed descriptions in step S121 shown in FIG. 2.

At step S522: set the first dominant color as a color of the background layer.

The background layer may be a layer with unchanged transparency or a layer with gradient transparency.

At step S53: output the to-be-displayed interface that has undergone the color updating processing to a display device for displaying.

In the embodiment shown in FIG. 13, the terminal sets the first dominant color as the color of the background layer, and the target image is used as the background of the background layer. Because the first dominant color is the main color in the target image, there is good color fusion between the color of the background layer and the color of the target image.

For how to generate the first dominant color based on the color in the target image in the embodiment shown in FIG. 13, refer to the embodiment shown in FIG. 6 and the embodiment shown in FIG. 11.

Figure 14:
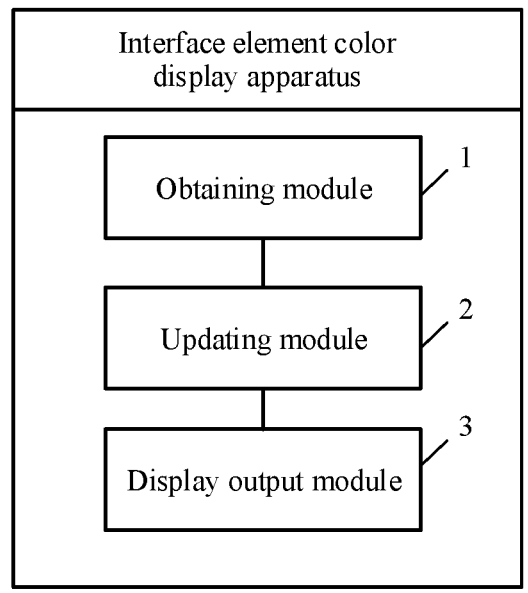
FIG. 14 is a schematic diagram of a terminal according to an embodiment of this application.

FIG. 14 is a schematic diagram of a terminal according to an embodiment of this application. The terminal includes the following modules.

An obtaining module 1 is configured to obtain a target image included in a to-be-displayed interface, where the to-be-displayed interface includes a foreground element and a background element, the background element is used as a background of the foreground element, and the background element includes the target image. For a detailed implementation, refer to detailed descriptions corresponding to step S11 in the method embodiment shown in FIG. 2.

An updating module 2 is configured to perform color updating processing on the to-be-displayed interface, including: determining a first dominant color of the target image, determining a color type of the target image based on an area-based ratio of the first dominant color in the target image, determining a first auxiliary color based on the color type, and setting the first auxiliary color as a color of the foreground element, where the first dominant color is a main color in the target image, and the first auxiliary color is a color with a hue close to that of the first dominant color but with a difference in saturation or brightness. For a detailed implementation, refer to detailed descriptions corresponding to step S12 in the method embodiment shown in FIG. 2.

A display output module 3 is configured to output the to-be-displayed interface that has undergone the color updating processing to a display device for displaying. For a detailed implementation, refer to detailed descriptions corresponding to step S13 in the method embodiment shown in FIG. 2.

In a feasible embodiment, the updating module 2 is configured to: obtain a dominant color adjustment parameter corresponding to the color type of the target image, where the dominant color adjustment parameter includes at least one of brightness and saturation; adjust the first dominant color based on the dominant color adjustment parameter to generate a first bright auxiliary color and a first dark auxiliary color; and determine the first bright auxiliary color or the first dark auxiliary color as the first auxiliary color.

In a feasible embodiment, the updating module 2 is configured to: when the color type of the target image is a polychromatic general type or a monochromatic colorful type, obtain a first brightness adjustment value, a second brightness adjustment value, a first saturation adjustment value, and a second saturation adjustment value corresponding to the polychromatic general type or the monochromatic colorful type, where the first brightness adjustment value and the second brightness adjustment value are separately used to adjust brightness of the first dominant color, the first saturation adjustment value and the second saturation adjustment value are separately used to adjust saturation of the first dominant color, and the dominant color adjustment parameter includes the first brightness adjustment value, the second brightness adjustment value, the first saturation adjustment value, and the second saturation adjustment value; the polychromatic general type is used to indicate that a ratio of a quantity of pixels corresponding to the first dominant color in the target image to a quantity of pixels corresponding to the target image is less than a first threshold, a ratio of a quantity of pixels corresponding to colors having a same three-channel red-green-blue value in the target image to the quantity of pixels corresponding to the target image is less than a second threshold, and the saturation of the first dominant color is greater than a third threshold; and the monochromatic colorful type is used to indicate that the ratio of the quantity of pixels corresponding to the first dominant color in the target image to the quantity of pixels corresponding to the target image is greater than the first threshold, and the saturation of the first dominant color is greater than 0.

In a feasible embodiment, the updating module 2 is configured to: when the color type of the target image is a polychromatic low saturation type, a polychromatic grayscale type, or a monochromatic achromatic type, obtain a first brightness adjustment value and a second brightness adjustment value corresponding to the polychromatic low saturation type, the polychromatic grayscale type, or the monochromatic achromatic type, where the first brightness adjustment value and the second brightness adjustment value are separately used to adjust brightness of the first dominant color, and the dominant color adjustment parameter includes the first brightness adjustment value and the second brightness adjustment value; the polychromatic low saturation type is used to indicate that a ratio of a quantity of pixels corresponding to the first dominant color in the target image to a quantity of pixels corresponding to the target image is less than a first threshold, a ratio of a quantity of pixels corresponding to colors having a same three-channel red-green-blue value in the target image to the quantity of pixels corresponding to the target image is less than a second threshold, and saturation of the first dominant color is less than a third threshold; the polychromatic grayscale type is used to indicate that the ratio of the quantity of pixels corresponding to the first dominant color in the target image to the quantity of pixels corresponding to the target image is less than the first threshold, and the ratio of the quantity of pixels corresponding to the colors having the same three-channel red-green-blue value in the target image to the quantity of pixels corresponding to the target image is greater than the second threshold; and the monochromatic achromatic type is used to indicate that the ratio of the quantity of pixels corresponding to the first dominant color in the target image to the quantity of pixels corresponding to the target image is greater than the first threshold, and the saturation of the first dominant color is equal to 0.

In a feasible embodiment, the updating module 2 is configured to adjust the brightness and saturation of the first dominant color based on the first brightness adjustment value and the first saturation adjustment value to generate the first bright auxiliary color, and adjust the brightness and saturation of the first dominant color based on the second brightness adjustment value and the second saturation adjustment value to generate the first dark auxiliary color.

In a feasible embodiment, the updating module 2 is configured to adjust the brightness of the first dominant color based on the first brightness adjustment value to generate the first bright auxiliary color, and adjust the brightness of the first dominant color based on the second brightness adjustment value to generate the first dark auxiliary color.

In a feasible embodiment, the updating module 2 is configured to: determine whether a ratio of a brightness differentiation parameter of the first dominant color to a brightness differentiation parameter of the first bright auxiliary color is greater than a fourth threshold or less than a reciprocal of the fourth threshold; and when the ratio of the brightness differentiation parameter of the first dominant color to the brightness differentiation parameter of the first bright auxiliary color is greater than the fourth threshold or less than the reciprocal of the fourth threshold, determine the first bright auxiliary color as the first auxiliary color; or when the ratio of the brightness differentiation parameter of the first dominant color to the brightness differentiation parameter of the first bright auxiliary color is less than the fourth threshold or greater than the reciprocal of the fourth threshold, determine the first dark auxiliary color as the first auxiliary color, where the brightness differentiation parameter of the first bright auxiliary color is greater than a brightness differentiation parameter of the first dark auxiliary color, the brightness differentiation parameter of the first dominant color is obtained through calculation based on a three-channel red-green-blue value of the first dominant color, the brightness differentiation parameter of the first bright auxiliary color is obtained through calculation based on a three-channel red-green-blue value of the first bright auxiliary color, and the brightness differentiation parameter of the first dark auxiliary color is obtained through calculation based on a three-channel red-green-blue value of the first dark auxiliary color.

In a feasible embodiment, the updating module 2 is configured to: obtain each color in the target image; sort each color in the target image in a preset arrangement order to obtain a color queue, where the preset arrangement order is a pre-generated arrangement order of colors; divide the color queue into a plurality of color groups based on a preset grouping method and a quantity of pixels of each color in the target image, where each of the plurality of color groups includes at least one color; determine, in the plurality of color groups, a target color group having a largest quantity of pixels; and generate the first dominant color based on all colors in the target color group.

In a feasible embodiment, the updating module 2 is configured to: obtain a three-channel red-green-blue value of each color in the target color group, where the three-channel red-green-blue value includes a red channel value, a green channel value, and a blue channel value; calculate a target red channel value based on the red channel value of each color in the target color group and a ratio of a quantity of pixels of each color in the target color group to a quantity of pixels in the target color group; calculate a target green channel value based on the green channel value of each color in the target color group and the ratio of the quantity of pixels of each color in the target color group to the quantity of pixels in the target color group; calculate a target blue channel value based on the blue channel value of each color in the target color group and the ratio of the quantity of pixels of each color in the target color group to the quantity of pixels in the target color group; and combine the target red channel value, the target green channel value, and the target blue channel value into a target three-channel red-green-blue value to obtain the first dominant color.

In a feasible embodiment, the updating module 2 is further configured to: when the color type of the target image is a polychromatic type, determine, in the plurality of color groups, a specified color group having a second largest quantity of pixels, and generate a second dominant color based on all colors in the specified color group, where the polychromatic type is used to indicate that a ratio of a quantity of pixels corresponding to the first dominant color in the target image to a quantity of pixels corresponding to the target image is less than a first threshold.

In a feasible embodiment, the updating module 2 is further configured to: when the color type of the target image is a monochromatic colorful type, obtain a second dominant color adjustment value corresponding to the monochromatic colorful type, and configure the hue of the first dominant color based on the second dominant color adjustment value to generate a second dominant color, where the monochromatic colorful type is used to indicate that a ratio of a quantity of pixels corresponding to the first dominant color in the target image to a quantity of pixels corresponding to the target image is greater than a first threshold, and saturation of the first dominant color is greater than 0.

In a feasible embodiment, the updating module 2 is further configured to: when the color type of the target image is a monochromatic achromatic type, obtain a second dominant color adjustment value corresponding to the monochromatic achromatic type, and configure brightness of the first dominant color based on the second dominant color adjustment value to generate a second dominant color, where the monochromatic achromatic type is used to indicate that a ratio of a quantity of pixels corresponding to the first dominant color in the target image to a quantity of pixels corresponding to the target image is greater than a first threshold, and saturation of the first dominant color is equal to 0.

In a feasible embodiment, the updating module 2 is further configured to: obtain a dominant color adjustment parameter corresponding to the color type of the target image, where the dominant color adjustment parameter includes at least one of brightness and saturation; adjust the second dominant color based on the dominant color adjustment parameter to generate a second bright auxiliary color and a second dark auxiliary color; determine the second bright auxiliary color or the second dark auxiliary color as a second auxiliary color, where the second auxiliary color is a color with a hue close to that of the second dominant color but with a difference in saturation or brightness; when an instruction for setting the second auxiliary color as the color of the foreground element is received, set the second auxiliary color as the color of the foreground element; and set the second dominant color as a color of a background layer, where the background layer is a layer with unchanged transparency or a layer with gradient transparency, the background element further includes the background layer, and the background layer is located between the target image and the foreground element.

In a feasible embodiment, the updating module 2 is further configured to set the first dominant color as a color of a background layer, where the background layer is a layer with unchanged transparency or a layer with gradient transparency.

In a feasible embodiment, the updating module 2 is further configured to: obtain an image region by extending one side or a plurality of sides of the target image, where the image region includes the first dominant color; and use the image region and the target image as an updated target image.

Figure 15:
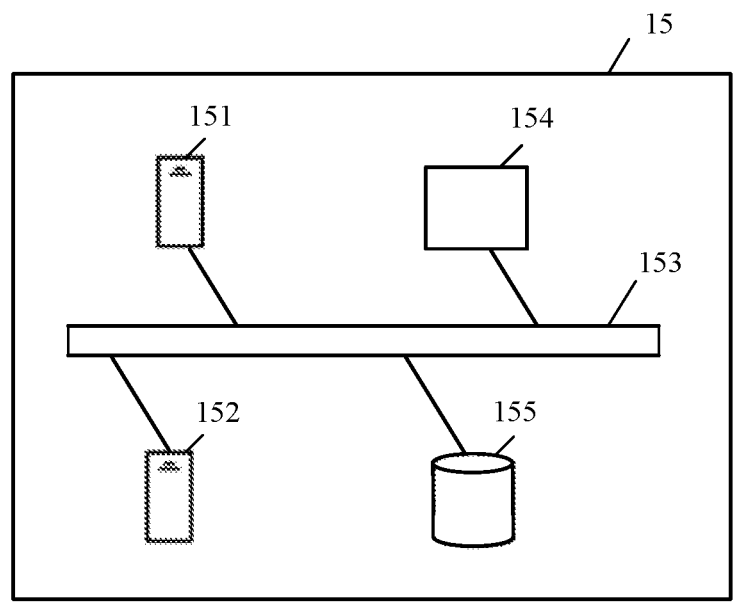
FIG. 15 is a schematic diagram of a terminal according to an embodiment of this application.

FIG. 15 is a schematic diagram of a terminal according to an embodiment of this application. The terminal 15 includes a central processing unit 151, an image processor 152, a bus 153, a memory 154, and a non-volatile memory (NVM) memory 155. The terminal 15 in FIG. 15 is equivalent to the terminal 1 in FIG. 1. For detailed descriptions about the terminal 15 in FIG. 15, refer to detailed descriptions about the terminal 1 in the embodiment corresponding to FIG. 1.

The terminal 15 shown in FIG. 15 may run the interface element color display methods in the embodiments corresponding to FIG. 2, FIG. 6, FIG. 11, FIG. 12, and FIG. 13. With reference to FIG. 2 and FIG. 15, the central processing unit 151 may obtain, from the non-volatile memory 155 by using the a bus 153, a target image included in a to-be-displayed interface, and store the target image in the memory 154 by using the bus 153. Then the central processing unit 151 performs color updating processing on the to-be-displayed interface. Finally, the image processor 152 receives the to-be-displayed interface that has undergone the color updating processing by the central processing unit 151, and outputs the to-be-displayed interface that has undergone the color updating processing to a display device for displaying.

What is claimed is:

1. An interface element color display method, wherein the method comprises:
    obtaining a target image comprised in a to-be-displayed interface, wherein the to-be-displayed interface comprises a foreground element and a background element, the background element is used as a background of the foreground element, and the background element comprises the target image;
    performing color updating processing on the to-be-displayed interface, comprising:
        determining a first dominant color of the target image;
        determining a color type of the target image based on an area-based ratio of the first dominant color in the target image;
        determining a first auxiliary color based on the color type; and
        setting the first auxiliary color as a color of the foreground element, and
        wherein the first dominant color is a main color in the target image, and the first auxiliary color is a color with a hue close to that of the first dominant color but with a difference in saturation or brightness; and
    outputting the to-be-displayed interface that has undergone the color updating processing to a display device for displaying,
    wherein the color type of the target image is a polychromatic general type or a monochromatic colorful type, and
    wherein the polychromatic general type or the monochromatic colorful type is associated with a ratio of a quantity of pixels of the first dominant color in the target image to a quantity of pixels in the target image.

2. The interface element color display method according to claim 1, wherein the determining the first auxiliary color based on the color type comprises: obtaining a dominant color adjustment parameter corresponding to the color type of the target image, wherein the dominant color adjustment parameter comprises at least one of brightness or saturation; adjusting the first dominant color based on the dominant color adjustment parameter to generate a first bright auxiliary color and a first dark auxiliary color; and determining the first bright auxiliary color or the first dark auxiliary color as the first auxiliary color.

3. The interface element color display method according to claim 2, wherein the obtaining the dominant color adjustment parameter corresponding to the color type of the target image comprises: obtaining a first brightness adjustment value, a second brightness adjustment value, a first saturation adjustment value, and a second saturation adjustment value corresponding to the polychromatic general type or the monochromatic colorful type, wherein the first brightness adjustment value and the second brightness adjustment value separately adjust brightness of the first dominant color, the first saturation adjustment value and the second saturation adjustment value separately adjust saturation of the first dominant color, and the dominant color adjustment parameter comprises the first brightness adjustment value, the second brightness adjustment value, the first saturation adjustment value, and the second saturation adjustment value; the polychromatic general type indicates that a ratio of a quantity of pixels of the first dominant color in the target image to a quantity of pixels in the target image is less than a first threshold, a ratio of a quantity of pixels of colors having a same three-channel red-green-blue value in the target image to the quantity of pixels in the target image is less than a second threshold, and the saturation of the first dominant color is greater than a third threshold; and the monochromatic colorful type indicates that the ratio of the quantity of pixels of the first dominant color in the target image to the quantity of pixels in the target image is greater than the first threshold, and the saturation of the first dominant color is greater than 0; or in response to the color type of the target image being a polychromatic low saturation type, a polychromatic grayscale type, or a monochromatic achromatic type, obtaining a first brightness adjustment value and a second brightness adjustment value corresponding to the polychromatic low saturation type, the polychromatic grayscale type, or the monochromatic achromatic type, wherein the first brightness adjustment value and the second brightness adjustment value separately adjust brightness of the first dominant color, and the dominant color adjustment parameter comprises the first brightness adjustment value and the second brightness adjustment value; the polychromatic low saturation type indicates that a ratio of a quantity of pixels of the first dominant color in the target image to a quantity of pixels in the target image is less than the first threshold, a ratio of a quantity of pixels of colors having a same three-channel red-green-blue value in the target image to the quantity of pixels in the target image is less than the second threshold, and saturation of the first dominant color is less than the third threshold; the polychromatic grayscale type indicates that the ratio of the quantity of pixels of the first dominant color in the target image to the quantity of pixels in the target image is less than the first threshold, and the ratio of the quantity of pixels of the colors having the same three-channel red-green-blue value in the target image to the quantity of pixels in the target image is greater than the second threshold; and the monochromatic achromatic type indicates that the ratio of the quantity of pixels of the first dominant color in the target image to the quantity of pixels in the target image is greater than the first threshold, and the saturation of the first dominant color is equal to 0.

4. The interface element color display method according to claim 3, wherein the adjusting the first dominant color based on the dominant color adjustment parameter to generate the first bright auxiliary color and the first dark auxiliary color comprises: adjusting the brightness and saturation of the first dominant color based on the first brightness adjustment value and the first saturation adjustment value to generate the first bright auxiliary color, and adjusting the brightness and saturation of the first dominant color based on the second brightness adjustment value and the second saturation adjustment value to generate the first dark auxiliary color; or adjusting the brightness of the first dominant color based on the first brightness adjustment value to generate the first bright auxiliary color, and adjusting the brightness of the first dominant color based on the second brightness adjustment value to generate the first dark auxiliary color.

5. The interface element color display method according to claim 4, wherein the determining the first bright auxiliary color or the first dark auxiliary color as the first auxiliary color comprises: determining whether a ratio of a brightness differentiation parameter of the first dominant color to a brightness differentiation parameter of the first bright auxiliary color is greater than a fourth threshold or less than a reciprocal of the fourth threshold; and in response to the ratio of the brightness differentiation parameter of the first dominant color to the brightness differentiation parameter of the first bright auxiliary color being greater than the fourth threshold or less than the reciprocal of the fourth threshold, determining the first bright auxiliary color as the first auxiliary color; or in response to the ratio of the brightness differentiation parameter of the first dominant color to the brightness differentiation parameter of the first bright auxiliary color being less than the fourth threshold or greater than the reciprocal of the fourth threshold, determining the first dark auxiliary color as the first auxiliary color.

6. The interface element color display method according to claim 1, wherein the determining the first dominant color of the target image comprises: obtaining each color in the target image; sorting each color in the target image in a preset arrangement order to obtain a color queue, wherein the preset arrangement order is a pre-generated arrangement order of colors; dividing the color queue into a plurality of color groups based on a preset grouping method and a quantity of pixels of each color in the target image, wherein each of the plurality of color groups comprises at least one color; determining, in the plurality of color groups, a target color group having a largest quantity of pixels; and generating the first dominant color based on all colors in the target color group.

7. The interface element color display method according to claim 6, wherein the generating the first dominant color based on all colors in the target color group comprises: obtaining a three-channel red-green-blue value of each color in the target color group, wherein the three-channel red-green-blue value comprises a red channel value, a green channel value, and a blue channel value; calculating a target red channel value based on the red channel value of each color in the target color group and a ratio of a quantity of pixels of each color in the target color group to a quantity of pixels in the target color group; calculating a target green channel value based on the green channel value of each color in the target color group and the ratio of the quantity of pixels of each color in the target color group to the quantity of pixels in the target color group; calculating a target blue channel value based on the blue channel value of each color in the target color group and the ratio of the quantity of pixels of each color in the target color group to the quantity of pixels in the target color group; and combining the target red channel value, the target green channel value, and the target blue channel value into a target three-channel red-green-blue value to obtain the first dominant color.

8. The interface element color display method according to claim 6, wherein after the determining the color type of the target image based on the area-based ratio of the first dominant color in the target image, the method further comprises: in response to the color type of the target image being a polychromatic type, determining, in the plurality of color groups, a specified color group having a second largest quantity of pixels, and generating a second dominant color based on all colors in the specified color group, wherein the polychromatic type indicates that a ratio of a quantity of pixels of the first dominant color in the target image to a quantity of pixels in the target image being less than a first threshold; or in response to the color type of the target image being a monochromatic colorful type, obtaining a second dominant color adjustment value corresponding to the monochromatic colorful type, and configuring the hue of the first dominant color based on the second dominant color adjustment value to generate a second dominant color, wherein the monochromatic colorful type indicates that a ratio of a quantity of pixels of the first dominant color in the target image to a quantity of pixels in the target image is greater than the first threshold, and saturation of the first dominant color is greater than 0; or in response to the color type of the target image being a monochromatic achromatic type, obtaining a second dominant color adjustment value corresponding to the monochromatic achromatic type, and configuring brightness of the first dominant color based on the second dominant color adjustment value to generate a second dominant color, wherein the monochromatic achromatic type indicates that a ratio of a quantity of pixels of the first dominant color in the target image to a quantity of pixels in the target image is greater than the first threshold, and saturation of the first dominant color is equal to 0.

9. The interface element color display method according to claim 8, wherein after the second dominant color is generated, the method further comprises: obtaining a dominant color adjustment parameter corresponding to the color type of the target image, wherein the dominant color adjustment parameter comprises at least one of brightness and saturation; adjusting the second dominant color based on the dominant color adjustment parameter to generate a second bright auxiliary color and a second dark auxiliary color; determining the second bright auxiliary color or the second dark auxiliary color as a second auxiliary color, wherein the second auxiliary color is a color with a hue close to that of the second dominant color but with a difference in saturation or brightness; in response to an instruction for setting the second auxiliary color as the color of the foreground element being received, setting the second auxiliary color as the color of the foreground element; and setting the second dominant color as a color of a background layer, wherein the background layer is a layer with unchanged transparency or a layer with gradient transparency, the background element further comprises the background layer, and the background layer is located between the target image and the foreground element.

10. The interface element color display method according to claim 1, wherein the background element further comprises a background layer, the background layer is located between the target image and the foreground element, and the performing color updating processing on the target image further comprises: setting the first dominant color as a color of the background layer, wherein the background layer is a layer with unchanged transparency or a layer with gradient transparency.

11. The interface element color display method according to claim 1, wherein after the determining the first dominant color of the target image, and before outputting the to-be-displayed interface that has undergone the color updating processing to the display device for displaying, the method further comprises: obtaining an image region by extending one side or a plurality of sides of the target image, wherein the image region comprises the first dominant color; and using the image region and the target image as an updated target image.

12. A terminal, comprising: a memory configured to store computer-executable instructions; and
one or more processors configured to execute the instructions to cause the terminal to:
obtain a target image comprised in a to-be-displayed interface, wherein the to-be-displayed interface comprises a foreground element and a background element, the background element is used as a background of the foreground element, and the background element comprises the target image;
perform color updating processing on the to-be-displayed interface, comprising: determining a first dominant color of the target image; determining a color type of the target image based on an area-based ratio of the first dominant color in the target image; determining a first auxiliary color based on the color type; and setting the first auxiliary color as a color of the foreground element, and wherein the first dominant color is a main color in the target image, and the first auxiliary color is a color with a hue close to that of the first dominant color but with a difference in saturation or brightness; and output the to-be-displayed interface that has undergone the color updating processing to a display device for displaying, wherein the color type of the target image is a polychromatic general type or a monochromatic colorful type, and wherein the polychromatic general type or the monochromatic colorful type is associated with a ratio of a quantity of pixels of the first dominant color in the target image to a quantity of pixels in the target image.

13. The terminal according to claim 12, wherein the one or more processors execute the instructions to further cause the terminal to: obtain a dominant color adjustment parameter corresponding to the color type of the target image, wherein the dominant color adjustment parameter comprises at least one of brightness or saturation; adjust the first dominant color based on the dominant color adjustment parameter to generate a first bright auxiliary color and a first dark auxiliary color; and determine the first bright auxiliary color or the first dark auxiliary color as the first auxiliary color.

14. The terminal according to claim 13, wherein the one or more processors execute the instructions to further cause the terminal to: obtain a first brightness adjustment value, a second brightness adjustment value, a first saturation adjustment value, and a second saturation adjustment value corresponding to the polychromatic general type or the monochromatic colorful type, wherein the first brightness adjustment value and the second brightness adjustment value separately adjust brightness of the first dominant color, the first saturation adjustment value and the second saturation adjustment value separately adjust saturation of the first dominant color, and the dominant color adjustment parameter comprises the first brightness adjustment value, the second brightness adjustment value, the first saturation adjustment value, and the second saturation adjustment value; the polychromatic general type indicates that a ratio of a quantity of pixels of the first dominant color in the target image to a quantity of pixels in the target image is less than a first threshold, a ratio of a quantity of pixels of colors having a same three-channel red-green-blue value in the target image to the quantity of pixels in the target image is less than a second threshold, and the saturation of the first dominant color is greater than a third threshold; and the monochromatic colorful type indicates that the ratio of the quantity of pixels of the first dominant color in the target image to the quantity of pixels in the target image is greater than the first threshold, and the saturation of the first dominant color is greater than 0; or in response to the color type of the target image being a polychromatic low saturation type, a polychromatic grayscale type, or a monochromatic achromatic type, obtain a first brightness adjustment value and a second brightness adjustment value corresponding to the polychromatic low saturation type, the polychromatic grayscale type, or the monochromatic achromatic type, wherein the first brightness adjustment value and the second brightness adjustment value separately adjust brightness of the first dominant color, and the dominant color adjustment parameter comprises the first brightness adjustment value and the second brightness adjustment value; the polychromatic low saturation type indicates that a ratio of a quantity of pixels of the first dominant color in the target image to a quantity of pixels in the target image is less than the first threshold, a ratio of a quantity of pixels of colors having a same three-channel red-green-blue value in the target image to the quantity of pixels in the target image is less than the second threshold, and saturation of the first dominant color is less than the third threshold; the polychromatic grayscale type indicates that the ratio of the quantity of pixels of the first dominant color in the target image to the quantity of pixels in the target image is less than the first threshold, and the ratio of the quantity of pixels of the colors having the same three-channel red-green-blue value in the target image to the quantity of pixels in the target image is greater than the second threshold; and the monochromatic achromatic type indicates that the ratio of the quantity of pixels of the first dominant color in the target image to the quantity of pixels in the target image is greater than the first threshold, and the saturation of the first dominant color is equal to 0.

15. The terminal according to claim 14, wherein the one or more processors execute the instructions to further cause the terminal to: adjust the brightness and saturation of the first dominant color based on the first brightness adjustment value and the first saturation adjustment value to generate the first bright auxiliary color, and adjust the brightness and saturation of the first dominant color based on the second brightness adjustment value and the second saturation adjustment value to generate the first dark auxiliary color; or adjust the brightness of the first dominant color based on the first brightness adjustment value to generate the first bright auxiliary color, and adjust the brightness of the first dominant color based on the second brightness adjustment value to generate the first dark auxiliary color.

16. The terminal according to claim 15, wherein the one or more processors execute the instructions to further cause the terminal to: determine whether a ratio of a brightness differentiation parameter of the first dominant color to a brightness differentiation parameter of the first bright auxiliary color is greater than a fourth threshold or less than a reciprocal of the fourth threshold; and in response to the ratio of the brightness differentiation parameter of the first dominant color to the brightness differentiation parameter of the first bright auxiliary color is greater than the fourth threshold or less than the reciprocal of the fourth threshold, determine the first bright auxiliary color as the first auxiliary color; or in response to the ratio of the brightness differentiation parameter of the first dominant color to the brightness differentiation parameter of the first bright auxiliary color is less than the fourth threshold or greater than the reciprocal of the fourth threshold, determine the first dark auxiliary color as the first auxiliary color.

17. The terminal according to claim 12, wherein the one or more processors execute the instructions to further cause the terminal to: obtain each color in the target image; sort each color in the target image in a preset arrangement order to obtain a color queue, wherein the preset arrangement order is a pre-generated arrangement order of colors; divide the color queue into a plurality of color groups based on a preset grouping method and a quantity of pixels of each color in the target image, wherein each of the plurality of color groups comprises at least one color; determine, in the plurality of color groups, a target color group having a largest quantity of pixels; and generate the first dominant color based on all colors in the target color group.

18. The terminal according to claim 17, wherein the one or more processors execute the instructions to further cause the terminal to: obtain a three-channel red-green-blue value of each color in the target color group, wherein the three-channel red-green-blue value comprises a red channel value, a green channel value, and a blue channel value; calculate a target red channel value based on the red channel value of each color in the target color group and a ratio of a quantity of pixels of each color in the target color group to a quantity of pixels in the target color group; calculate a target green channel value based on the green channel value of each color in the target color group and the ratio of the quantity of pixels of each color in the target color group to the quantity of pixels in the target color group; calculate a target blue channel value based on the blue channel value of each color in the target color group and the ratio of the quantity of pixels of each color in the target color group to the quantity of pixels in the target color group; and combine the target red channel value, the target green channel value, and the target blue channel value into a target three-channel red-green-blue value to obtain the first dominant color.

19. The terminal according to claim 17, wherein the one or more processors execute the instructions to further cause the terminal to: in response to the color type of the target image being a polychromatic type, determine, in the plurality of color groups, a specified color group having a second largest quantity of pixels, and generate a second dominant color based on all colors in the specified color group, wherein the polychromatic type indicates that a ratio of a quantity of pixels of the first dominant color in the target image to a quantity of pixels in the target image is less than a first threshold; or in response to the color type of the target image being a monochromatic colorful type, obtain a second dominant color adjustment value corresponding to the monochromatic colorful type, and configure the hue of the first dominant color based on the second dominant color adjustment value to generate a second dominant color, wherein the monochromatic colorful type indicates that a ratio of a quantity of pixels of the first dominant color in the target image to a quantity of pixels in the target image is greater than the first threshold, and saturation of the first dominant color is greater than 0; or in response to the color type of the target image being a monochromatic achromatic type, obtain a second dominant color adjustment value corresponding to the monochromatic achromatic type, and configure brightness of the first dominant color based on the second dominant color adjustment value to generate a second dominant color, wherein the monochromatic achromatic type indicates that a ratio of a quantity of pixels of the first dominant color in the target image to a quantity of pixels in the target image is greater than the first threshold, and saturation of the first dominant color is equal to 0.

20. A non-transitory computer-readable storage medium, comprising computer-executable instructions which, when executed by one or more processors in a computer, cause the computer to:
  obtain a target image comprised in a to-be-displayed interface, wherein the to-be-displayed interface comprises a foreground element and a background element, the background element is used as a background of the foreground element, and the background element comprises the target image;
  perform color updating processing on the to-be-displayed interface, comprising: determining a first dominant color of the target image, determining a color type of the target image based on an area-based ratio of the first dominant color in the target image, determining a first auxiliary color based on the color type, and setting the first auxiliary color as a color of the foreground element, wherein the first dominant color is a main color in the target image, and the first auxiliary color is a color with a hue close to that of the first dominant color but with a difference in saturation or brightness; and
  output the to-be-displayed interface that has undergone the color updating processing to a display device for displaying, wherein the color type of the target image is a polychromatic general type or a monochromatic colorful type, and wherein the polychromatic general type or the monochromatic colorful type is associated with a ratio of a quantity of pixels of the first dominant color in the target image to a quantity of pixels in the target image.

* * * * *

UNITED STATES PATENT AND TRADEMARK OFFICE
CERTIFICATE OF CORRECTION

PATENT NO. : 11,663,754 B2
APPLICATION NO. : 17/879550
DATED : May 30, 2023
INVENTOR(S) : Ekstrand et al.

Page 1 of 1

It is certified that error appears in the above-identified patent and that said Letters Patent is hereby corrected as shown below:

In the Claims

Claim 8: Column 35, Line 57: "quantity of pixels in the target image being less than a first" should read -- quantity of pixels in the target image is less than a first --.

Claim 16: Column 38, Line 44: "the first bright auxiliary color is greater than the fourth" should read -- the first bright auxiliary color being greater than the fourth --.

Claim 16: Column 38, Line 49: "differentiation parameter of the first bright auxiliary color is" should read -- differentiation parameter of the first bright auxiliary color being --.

Signed and Sealed this
Fifth Day of September, 2023

Katherine Kelly Vidal
*Director of the United States Patent and Trademark Office*